US011412310B2

(12) United States Patent
Stockhammer et al.

(10) Patent No.: US 11,412,310 B2
(45) Date of Patent: Aug. 9, 2022

(54) PERFORMING AND EVALUATING SPLIT RENDERING OVER 5G NETWORKS

(71) Applicant: QUALCOMM Incorporated, San Diego, CA (US)

(72) Inventors: Thomas Stockhammer, Bergen (DE); Nikolai Konrad Leung, San Francisco, CA (US); Imed Bouazizi, Frisco, TX (US); Min Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/322,468

(22) Filed: May 17, 2021

(65) Prior Publication Data

US 2021/0360330 A1 Nov. 18, 2021

Related U.S. Application Data

(60) Provisional application No. 63/026,498, filed on May 18, 2020.

(51) Int. Cl.
*H04N 21/647* (2011.01)
*H04N 21/6437* (2011.01)
*H04N 21/6379* (2011.01)

(52) U.S. Cl.
CPC ... *H04N 21/64784* (2013.01); *H04N 21/6379* (2013.01); *H04N 21/6437* (2013.01); *H04N 21/64707* (2013.01); *H04N 21/64776* (2013.01)

(58) Field of Classification Search
None
See application file for complete search history.

(56) References Cited

U.S. PATENT DOCUMENTS

| | | | | |
|---|---|---|---|---|
| 8,942,109 | B2 * | 1/2015 | Dorenbosch | H04L 41/145 370/242 |
| 9,735,848 | B2 * | 8/2017 | Saiwai | H04L 5/0057 |

(Continued)

FOREIGN PATENT DOCUMENTS

| | | | |
|---|---|---|---|
| WO | WO-2018045985 A1 * | 3/2018 | ............. G02B 27/01 |
| WO | 2018237146 A1 | 12/2018 | |

OTHER PUBLICATIONS

International Search Report and Written Opinion—PCT/US2021/032962—ISA/EPO—dated Aug. 16, 2021, 13 pp.

(Continued)

*Primary Examiner* — William J Kim
(74) *Attorney, Agent, or Firm* — Shumaker & Sieffert, P.A.

(57) ABSTRACT

An example device includes a memory configured to store video data; and one or more processors implemented in circuitry and configured to: receive tracking and sensor information from an extended reality (XR) client device; generate scene data using the tracking and sensor information, the scene data comprising one or more video frames of the video data; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

39 Claims, 12 Drawing Sheets

(56) References Cited

U.S. PATENT DOCUMENTS

| | | | |
|---|---|---|---|
| 10,432,970 B1 | 10/2019 | Phillips et al. | |
| 10,659,190 B1* | 5/2020 | Liu | H04L 1/0018 |
| 2005/0147077 A1* | 7/2005 | Sutinen | H04L 43/50 |
| | | | 370/349 |
| 2013/0141523 A1* | 6/2013 | Banta | H04N 21/21805 |
| | | | 348/36 |
| 2013/0286860 A1* | 10/2013 | Dorenbosch | H04L 41/145 |
| | | | 370/252 |
| 2014/0359156 A1* | 12/2014 | Manber | H04N 21/2343 |
| | | | 709/231 |
| 2015/0046673 A1* | 2/2015 | Barry | G06F 9/30072 |
| | | | 712/7 |
| 2015/0333807 A1* | 11/2015 | Saiwai | H04B 7/063 |
| | | | 375/267 |
| 2018/0033209 A1* | 2/2018 | Akeley | G06T 19/20 |
| 2018/0212859 A1* | 7/2018 | Li | H04L 41/0896 |
| 2018/0329485 A1* | 11/2018 | Carothers | G06F 3/011 |
| 2019/0075269 A1* | 3/2019 | Nashida | H04N 21/41 |
| 2019/0333263 A1 | 10/2019 | Melkote Krishnaprasad et al. | |
| 2020/0098186 A1 | 3/2020 | Xue et al. | |
| 2020/0137462 A1 | 4/2020 | He et al. | |
| 2020/0280392 A1* | 9/2020 | Liu | H04L 1/0018 |

OTHER PUBLICATIONS

Jahaniaval A., et al., "Combined Data Partitioning and FMO in Distortion Modeling for Video Trace Generation with Lossy Network Parameters", Signal Processing and Information Technology, 2007 IEEE International Symposium ON, IEEE, Piscataway, NJ, USA, Dec. 15, 2007 (Dec. 15, 2007), pp. 972-976, XP031234162, 5 pp.
Qualcomm Incorporated (Rapporteur)1: "FS_XRTraffic: Permanent Document, V0. 6. 0", 3GPP Draft, S4-210614, 3rd Generation Partnership Project (3GPP), Mobile Competence Centre, 650, Route Des Lucioles, F-06921 Sophia-Antipolis Cedex, France, vol. SA WG4, No. e-meeting, Apr. 6, 2021-Apr. 14, 2021, Apr. 13, 2021 (Apr. 13, 2021), XP051995335, Retrieved from the Internet: URL: https://ftp.3gpp.org/tsg_sa/WG4_CODEC/TSGS4_113-e/Inbox, S4-210614-XRTraffic-PD-v0.6.0-rm.doc, [retrieved on Apr. 13, 2021].
Seeling P., et al., "Video Transport Evaluation with H.264 Video Traces", IEEE Communications Surveys & Tutorials, IEEE, USA, vol. 14, No. 4, Oct. 1, 2012 (Oct. 1, 2012), pp. 1142-1165, XP011471431, 24 pp.
Stockhammer T., (Qualcomm): "XR Traffic Modelling", 3GPP TSG SA WG4 Video SWG #3, 3GPP Draft; AHVIC-253, 3rd Generation Partnership Project (3GPP), Mobile Competence Centre, 650, Route Des Lucioles, F-06921 Sophia-Antipolis Cedex, France, May 11, 2020 (May 11, 2020), 10 Pages, XP051883102, Retrieved from the Internet: URL: https://ftp.3gpp.org/tsg_sa/WG4_CODEC/Ad-hoc_video_codec/Docs/AHVIC-253.zip, XR Traffic Modelling-3GPP-Telco.pptx [retrieved on May 11, 2020], 10 pp.
Tao S., et al., "Real-Time Monitoring of Video Quality in IP Networks", IEEE /ACM Transactions on Networking, IEEE/ACM, New York, NY, US, vol. 16, No. 5, Oct. 1, 2008 (Oct. 1, 2008), pp. 1052-1065, XP058185939, ISSN: 1063-6692.
3GPP: 5G; Extended Reality (XR) in 5G (3GPP TR 26.928 version 16.0.0 Release 16) ETSI TR 126 928 V16.0.0 (Nov. 2020), 133 Pages.
3GPP: "Typical Traffic Characteristics of Media Services on 3GPP Networks", TR 26.925, Release 16, Jul. 19, 2021, pp. 1-2.
"3rd Generation Partnership Project; Technical Specification Group Radio Access Network; Study on XR (Extended Reality) Evaluations for NR; (Release 17)", 3GPP TR 38.838 V0.0.1 (Nov. 2020), 9 Pages.

Beijing Xiaomi Mobile Software: "Proposed Updates to Baseline Technologies", TSG SA4#107 meeting, Tdoc S4-200218, Jan. 20-24, 2020, Wroclaw, Poland, 3 Pages.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.
FFmpeg: "Encode/H.264—FFmpeg", https://trac.ffmpeg.org/wiki/Encode/H.264, Jul. 19, 2021, pp. 1-8.
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Qualcomm Incorporated: "[FS_XRTraffic] Considerations for Traffic Modelling for Split Rendering", 3GPP TSG SA WG4#109-e meeting, S4-200772, May 20-Jun. 3, 2020, pp. 1-9.
Qualcomm Incorporated: "[FS_XRTraffic] From Traces to Statistical Models", 3GPP TSG-SA4 Meeting #112e, S4-210073, e-meeting, Feb. 1-10, 2021, pp. 1-5.
Qualcomm Incorporated: "[FS_XRTraffic] Proposed Additional Configurations, Traces and Traffic Models", 3GPP TSG-SA4 Meeting #112e, S4-210071, e-meeting, Feb. 1-10, 2021, pp. 1-20.
Qualcomm Incorporated: "[FS_XRTraffic] Proposed Annex to TR26.925", 3GPP TSG-SA4 Meeting #112e, e-meeting, Feb. 1-10, 2021, S4-210070, 3 Pages.
Qualcomm Incorporated: "[FS_XRTraffic] Proposed Quality Evaluation Framework", 3GPP TSG-SA4 Meeting #112e, S4-210074, e-meeting, Feb. 1-10, 2021, pp. 1-10.
Qualcomm Incorporated: "[FS_XRTraffic] System Design Assumptions for Split Rendering", 3GPP TSG SA WG4#109—e meeting, S4-200771, May 20-Jun. 3, 2020, pp. 1-8.
Qualcomm Incorporated: "[FS_XRTraffic] Traffic Model Overview and Status", 3GPP TSG SA WG4#111—e meeting, S4-201403, Nov. 11-20, 2020, p. 1.
Qualcomm Incorporated: "[FS_XRTraffic] Traffic Model Overview and Status", 3GPP TSG-SA4 Meeting #112e, S4-210072, e-meeting, Feb. 1-10, 2021, pp. 1-19.
Qualcomm Incorporated: "[FS_XRTraffic] Updated System Design Assumptions for Split Rendering", 3GPP TSG SA WG4#110—e meeting, S4-201083, Aug. 19-28, 2020, pp. 1-7.
Qualcomm Incorporated: "[FS_XRTraffic] Updated Traffic Modelling for Split Rendering", 3GPP TSG SA WG4#110—e meeting, S4-201084, Aug. 19-28, 2020, pp. 1-7.
Qualcomm Incorporated: "[FS_XRTraffic] Updated Traffic Modelling for Split Rendering", 3GPP TSG SA WG4#111—e meeting, S4-201401, Nov. 11-20, 2020, pp. 1-8.
Qualcomm Incorporated (Rapporteur): "FS_XRTraffic: Permanent Document, v0.1.0", 3GPP TSG SA WG4#109—e meeting, S4-200770, May 20-Jun. 3, 2020, pp. 1-7.
Qualcomm Incorporated (Rapporteur): "FS_XRTraffic: Permanent document, v0.3.1", 3GPP TSG SA WG4#111—e meeting, S4-201399, Aug. 11-20, 2020, pp. 1-29.
Qualcomm Incorporated: "Status Update of Simulation Software for Split Rendering", 3GPP TSG SA WG4#111—e meeting, S4-201400, Nov. 11-20, 2020, pp. 1-4.
QualcommIncorporated: "[FS_XRTraffic] Viewport-Dependent Streaming", SA4-e (AH) VideoSWG post 110-e (Sep. 14, 2020-Online), Oct. 27, 2020, S4aV200566, pp. 1-3.
Robitza W., "Understanding Rate Control Modes (x264, x265, vpx)", Mar. 1, 2017, pp. 1-12.
SLHCK: "CRF Guide (Constant Rate Factor in x264, x265 and libvpx)", https://slhck.info/video/2017/02/24/crf-guide.html, Feb. 24, 2017, pp. 1-6.

* cited by examiner (a) Average $\overline{\text{PSNR}}$

PERFORMING AND EVALUATING SPLIT RENDERING OVER 5G NETWORKS

This application claims the benefit of U.S. Provisional Application No. 63/026,498, filed May 18, 2020, the entire contents of which are hereby incorporated by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data and other media data have been encoded, the media data may be packetized for transmission or storage. The media data may be assembled into a video file conforming to any of a variety of standards, such as the International Organization for Standardization (ISO) base media file format and extensions thereof.

SUMMARY

In general, this disclosure describes techniques related to evaluating configuration of various components involved in performing split rendering for interactive media, such as online cloud video gaming. These techniques may be implemented by a computing device or a system of computing devices. These techniques include an evaluation framework for evaluating efficacy of these devices and configuration of these devices. For example, different portions of the system may be evaluated in different ways to determine different configuration settings. In particular, these techniques include evaluations at the video level, slice level, and packet level. Evaluations at the packet level can be used to determine whether a corresponding slice has been properly received. Evaluations at the slice level can be used to determine qualities of the slices and corresponding frames including the slices. Evaluations at the video level can be used to determine whether overall sets of configuration parameters for all components of the system are adequate.

In one example, a method of processing media data includes receiving tracking and sensor information from an extended reality (XR) client device; generating scene data using the tracking and sensor information, the scene data comprising one or more video frames; encoding the video frames to form encoded video frames; performing a radio access network (RAN) simulation of delivering the encoded video frames via a radio access network; decoding the encoded video frames delivered according to the RAN simulation to form decoded video frames; calculating values representing individual frame quality for each of the video frames from the generated one or more video frames and the decoded video frames; and determining an overall quality value from the values representing the individual frame quality for each of the video frames.

In another example, a device for processing media data includes a memory configured to store video data; and one or more processors implemented in circuitry and configured to: receive tracking and sensor information from an extended reality (XR) client device; generate scene data using the tracking and sensor information, the scene data comprising one or more video frames of the video data; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

In another example, a computer-readable storage medium has stored thereon instructions that, when executed, cause a processor to: receive tracking and sensor information from an extended reality (XR) client device; generate scene data using the tracking and sensor information, the scene data comprising one or more video frames; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

The details of one or more examples are set forth in the accompanying drawings and the description below. Other features, objects, and advantages will be apparent from the description and drawings, and from the claims.

DETAILED DESCRIPTION

Figure 1:
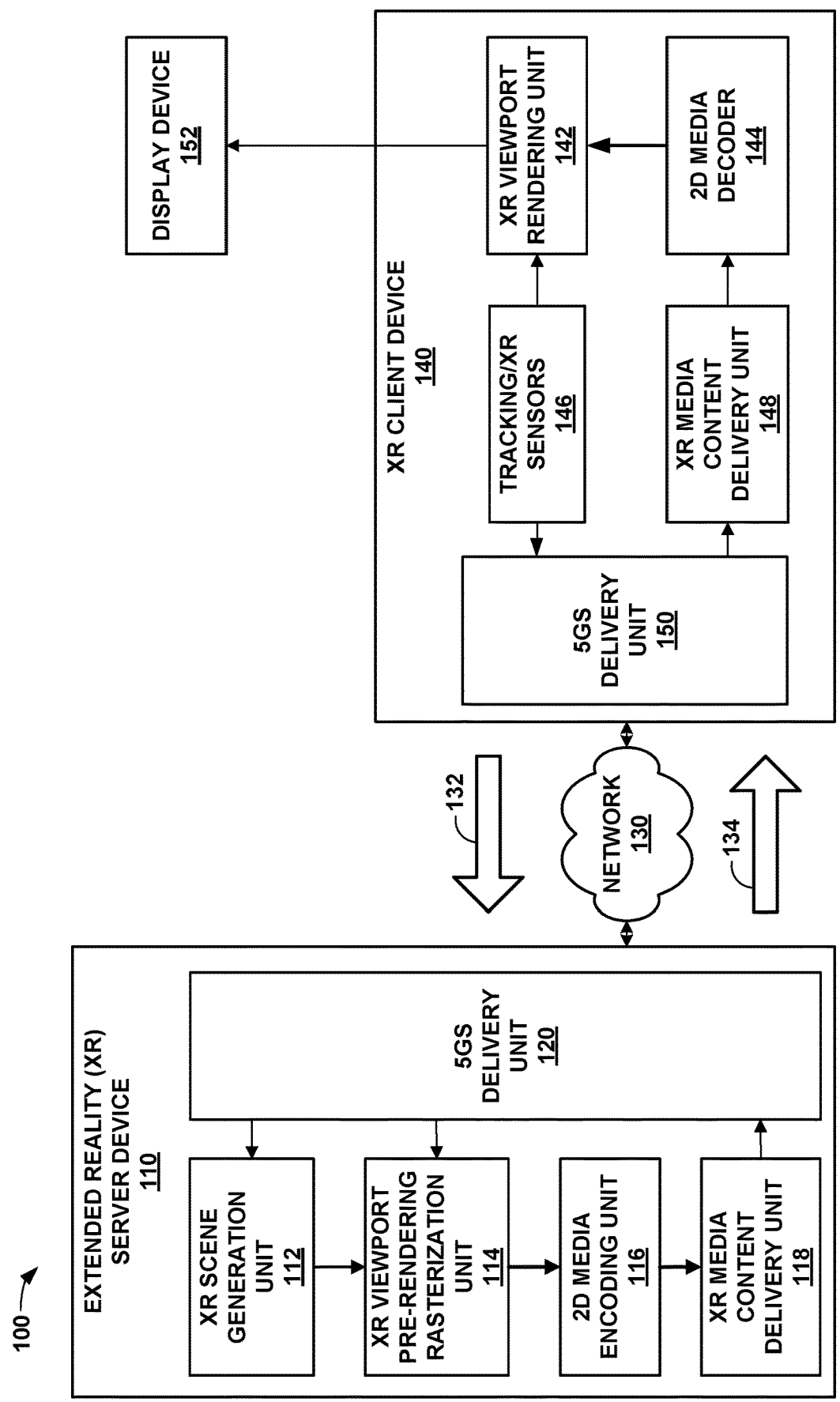
FIG. 1 is a block diagram illustrating an example computing system that may perform techniques of this disclosure.

FIG. 1 is a block diagram illustrating an example computing system 100 that may perform techniques of this disclosure. In this example, computing system 100 includes extended reality (XR) server device 110, network 130, XR client device 140, and display device 152. XR server device 110 includes XR scene generation unit 112, XR viewport pre-rendering rasterization unit 114, 2D media encoding unit 116, XR media content delivery unit 118, and 5G System (5GS) delivery unit 120. Network 130 may correspond to any network of computing devices that communicate according to one or more network protocols, such as the Internet. In particular, network 130 may include a 5G radio access network (RAN) including an access device to which XR client device 140 connects to access network 130 and XR server device 110. In other examples, other types of networks, such as other types of RANs, may be used. XR client device 140 includes 5GS delivery unit 150, tracking/XR sensors 146, XR viewport rendering unit 142, 2D media decoder 144, and XR media content delivery unit 148. XR client device 140 also interfaces with display device 152 to present XR media data to a user (not shown).

In some examples, XR scene generation unit 112 may correspond to an interactive media entertainment application, such as a video game, which may be executed by one or more processors implemented in circuitry of XR server device 110. XR viewport pre-rendering rasterization unit 114 may format scene data generated by XR scene generation unit 112 as pre-rendered two-dimensional (2D) media data (e.g., video data) for a viewport of a user of XR client device 140. 2D media encoding unit 116 may encode formatted scene data from XR viewport pre-rendering rasterization unit 114, e.g., using a video encoding standard, such as ITU-T H.264/Advanced Video Coding (AVC), ITU-T H.265/High Efficiency Video Coding (HEVC), ITU-T H.266 Versatile Video Coding (VVC), or the like. XR media content delivery unit 118 represents a content delivery sender, in this example. In this example, XR media content delivery unit 148 represents a content delivery receiver, and 2D media decoder 144 may perform error handling.

In general, XR client device 140 may determine a user's viewport, e.g., a direction in which a user is looking and a physical location of the user, which may correspond to an orientation of XR client device 140 and a geographic position of XR client device 140. Tracking/XR sensors 146 may determine such location and orientation data, e.g., using cameras, accelerometers, magnetometers, gyroscopes, or the like. Tracking/XR sensors 146 provide location and orientation data to XR viewport rendering unit 142 and 5GS delivery unit 150. XR client device 140 provides tracking and sensor information 132 to XR server device 110 via network 130. XR server device 110, in turn, receives tracking and sensor information 132 and provides this information to XR scene generation unit 112 and XR viewport pre-rendering rasterization unit 114. In this manner, XR scene generation unit 112 can generate scene data for the user's viewport and location, and then pre-render 2D media data for the user's viewport using XR viewport pre-rendering rasterization unit 114. XR server device 110 may therefore deliver encoded, pre-rendered 2D media data 134 to XR client device 140 via network 130, e.g., using a 5G radio configuration.

XR scene generation unit 112 may receive data representing a type of multimedia application (e.g., a type of video game), a state of the application, multiple user actions, or the like. XR viewport pre-rendering rasterization unit 114 may format a rasterized video signal. 2D media encoding unit 116 may be configured with a particular er/decoder (codec), bitrate for media encoding, a rate control algorithm and corresponding parameters, data for forming slices of pictures of the video data, low latency encoding parameters, error resilience parameters, intra-prediction parameters, or the like. XR media content delivery unit 118 may be configured with real-time transport protocol (RTP) parameters, rate control parameters, error resilience information, and the like. XR media content delivery unit 148 may be configured with feedback parameters, error concealment algorithms and parameters, post correction algorithms and parameters, and the like.

Raster-based split rendering refers to the case where XR server device 110 runs an XR engine (e.g., XR scene generation unit 112) to generate an XR scene based on information coming from an XR device, e.g., XR client device 140 and tracking and sensor information 132. XR server device 110 may rasterize an XR viewport and perform XR pre-rendering using XR viewport pre-rendering rasterization unit 114.

In the example of FIG. 1, the viewport is predominantly rendered in XR server device 110, but XR client device 140 is able to do latest pose correction, for example, using asynchronuous time-warping or other XR pose correction to address changes in the pose. XR graphics workload may be split into rendering workload on a powerful XR server device 110 (in the cloud or the edge) and pose correction (such as asynchronous timewarp (ATW)) on XR client device 140. Low motion-to-photon latency is preserved via on-device Asynchronous Time Warping (ATW) or other pose correction methods performed by XR client device 140.

In some examples, latency from rendering video data by XR server device 110 and XR client device 140 receiving such pre-rendered video data may be in the range of 50 milliseconds (ms). Latency for XR client device 140 to provide location and position (e.g., pose) information may be lower, e.g., 20 ms, but XR server device 110 may perform asynchronous time warp to compensate for the latest pose in XR client device 140.

The following call flow is an example highlighting steps of performing these techniques:
1) XR client device 140 connects to network 130 and joins an XR application (e.g., executed by XR scene generation unit 112).
   a) XR client device 140 sends static device information and capabilities (supported decoders, viewport).
2) Based on this information, XR server device 110 sets up encoders and formats.
3) Loop:
   a) XR client device 140 collects XR pose (or a predicted XR pose) using tracking/XR sensors 146.
   b) XR client device 140 sends XR pose information, in the form of tracking and sensor information 132, to XR server device 110.

c) XR server device 110 uses tracking and sensor information 132 to pre-render an XR viewport via XR scene generation unit 112 and XR viewport pre-rendering rasterization unit 114.
d) 2D media encoding unit 116 encodes the XR viewport.
e) XR media content delivery unit 118 and 5GS delivery unit 120 send the compressed media to XR client device 140, along with data representing the XR pose that the viewport was rendered for.
f) XR client device 140 decompresses the video data using 2D media decoder 144.
g) XR client device 140 uses the XR pose data provided with the video frame and the actual XR pose from tracking/XR sensors 146 for an improved prediction and to correct the local pose, e.g., using ATW performed by XR viewport rendering unit 142.

According to TR 26.928, clause 4.2.2, the relevant processing and delay components are summarized as follows:

User interaction delay is defined as the time duration between the moment at which a user action is initiated and the time such an action is taken into account by the content creation engine. In the context of gaming, this is the time between the moment the user interacts with the game and the moment at which the game engine processes such a player response.

Age of content is defined as the time duration between the moment a content is created and the time it is presented to the user. In the context of gaming, this is the time between the creation of a video frame by the game engine and the time at which the frame is finally presented to the player.

The roundtrip interaction delay is therefore the sum of the Age of Content and the User Interaction Delay. If part of the rendering is done on an XR server and the service produces a frame buffer as a rendering result of the state of the content, then for raster-based split rendering in cloud gaming applications, the following processes contribute to such a delay:

User Interaction Delay (Pose and other interactions)
  capture of user interaction in game client,
    delivery of user interaction to the game engine, i.e., to the server (aka network delay),
    processing of user interaction by the game engine/server,
Age of Content
  creation of one or several video buffers (e.g., one for each eye) by the game engine/server,
  encoding of the video buffers into a video stream frame,
  delivery of the video frame to the game client (a.k.a. network delay),
  decoding of the video frame by the game client,
  presentation of the video frame to the user (a.k.a. framerate delay).

As XR client device 140 applies ATW, the motion-to-photon latency requirements (of at most 20 ms) are met by internal processing of XR client device 140. What determines the network requirements for split rendering is time of pose-to-render-to-photon and the roundtrip interaction delay. According to TR 26.928, clause 4.5, the permitted downlink latency is typically 50-60 ms.

Rasterized 3D scenes available in frame buffers (see clause 4.4 of TR 26.928) are provided by XR scene generation unit 112 and need to be encoded, distributed, and decoded. According to TR 26.928, clause 4.2.1, relevant formats for frame buffers are 2 k by 2 k per eye, potentially even higher. Frame rates are expected to be at least 60 fps, potentially higher up to 90 fps. The formats of frame buffers are regular texture video signals that are then directly rendered. As the processing is graphics centric, formats beyond commonly used 4:2:0 signals and YUV signals may be considered.

In practical considerations, the NVIDIA Encoding functions may be used. The parameters of such an encoder are documented at developer.nvidia.com/nvidia-video-codec-sdk.

The techniques of this disclosure may be used to address certain challenges and achieve certain tasks. For instance, these techniques may be used to evaluate basic system design options and their performance, generate traffic models for evaluation of radio access network (RAN) options, provide guidelines for good parameter settings on encoding, content delivery, and RAN configurations, identify capacities for such types of applications, and define potential optimizations. These techniques may simulate these various elements with a reasonable setup.

In a first example, using split rendering, a full simulation for system 100 may be performed. In this example, 5G New Radio (NR) settings and simulations may be performed for communications via network 130, such as, for example, tracking and sensor information 132 and pre-rendered 2D media data 134. Tracking/XR sensors 146 may track and sense example user movements. Quality of video data presented at display device 152 may then be measured during these various simulations.

To perform this first example, simulations may be performed using a variety of models performing separate tasks. A source video model may include actions performed by XR scene generation unit 112, XR viewport pre-rendering rasterization unit 114, XR viewport rendering unit 142, 5GS delivery unit 120, and display device 152. A content delivery model may include actions performed by 2D media encoding unit 116, XR media content delivery unit 118, 5GS delivery unit 120, 5GS delivery unit 150, and 2D media decoder 144. An uplink model may include actions performed by tracking/XR sensors 146 and 5GS delivery unit 150. Tracking and sensor information 132 may be generated as part of a traffic model uplink, and RAN simulations may be performed to generate example pre-rendered 2D media data 134.

The various components of XR server device 110, XR client device 140, and display device 152 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

Based on the system design in S4-200771, some challenges for a potential simulation and for generation of traffic models exist as several aspects may be addressed, e.g., using certain techniques of this disclosure. Such challenges include:

Evaluating basic system design options and their performance.
Generating Traffic Models for the evaluation of RAN options.
Not violating any content license conditions.

Providing guidelines for good parameter settings on encoding, content delivery and also for RAN configurations.

Identifying the capacity for such type of applications.

Defining potential optimizations.

Simulating this in a reasonable setup in a repeatable fashion.

Simulation and modeling per system 100 may be broken into separate individual components:

Source video model

Encoding and content delivery

Radio access delivery

Content delivery receiver and decoder

Display process

Uplink traffic

Figure 2:
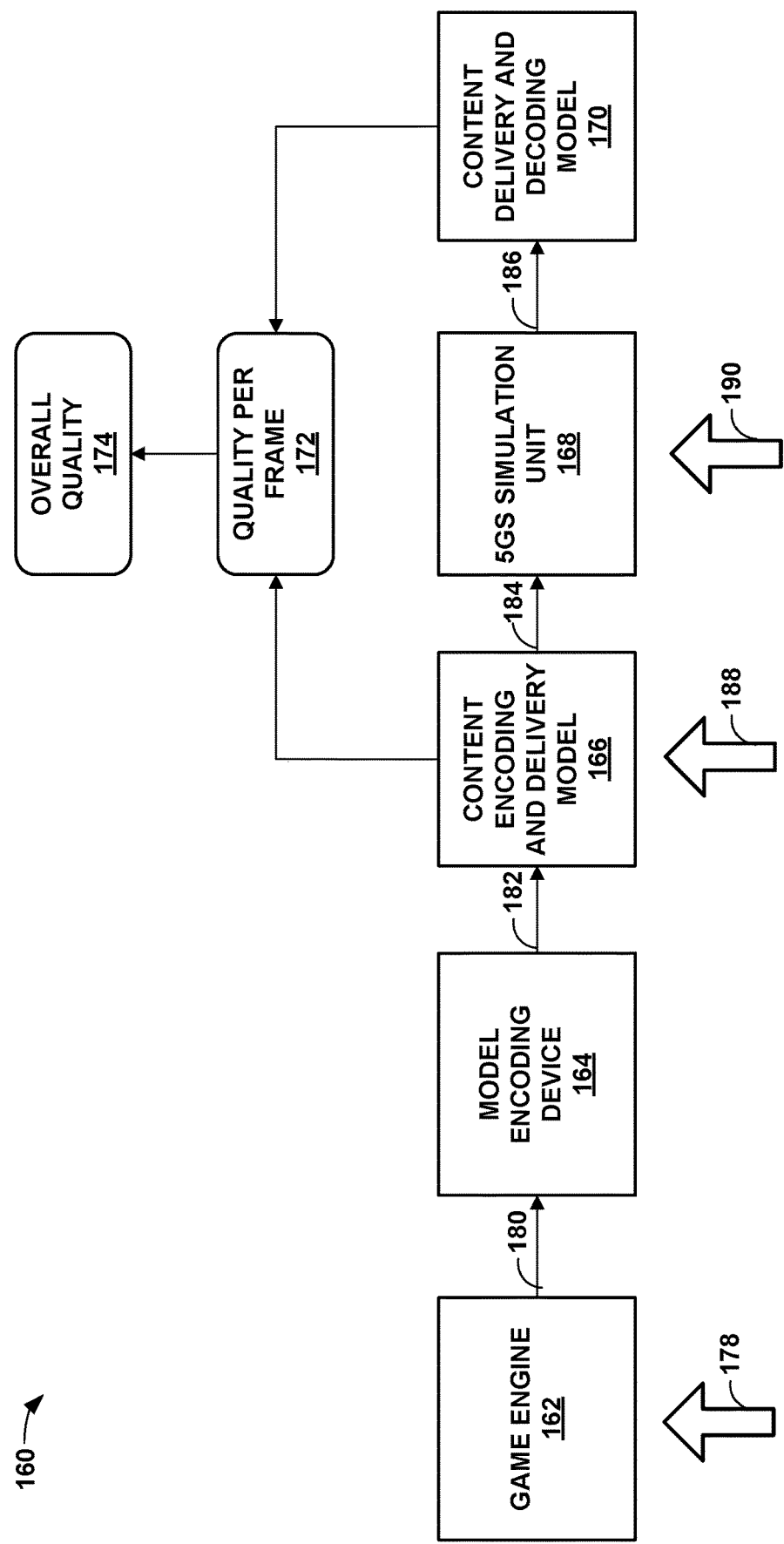
FIG. 2 is a conceptual diagram illustrating an example breakdown for simulating and measuring performance of a split rendering process performed by the computing system FIG. 1 according to the techniques of this disclosure.

FIG. 2 is a conceptual diagram illustrating an example breakdown of components of XR server device 110 for simulating and measuring performance of a split rendering process performed by computing system 100 of FIG. 1 according to the techniques of this disclosure. The example breakdown of FIG. 2 corresponds to the first example discussed above. In this example, system 160 includes game engine 162, model encoding device 164, content encoding and delivery model 166, 5GS simulation unit 168, and content delivery and decoding model 170. Thus, game engine 162 may correspond to XR scene generation unit 112 and XR viewport pre-rendering rasterization unit 114 of FIG. 1, model encoding device 164 may correspond to 2D media encoding unit 116 of FIG. 1, content encoding and delivery model 166 may correspond to XR media content delivery unit 118 and 5GS delivery unit 120 of FIG. 1, 5GS simulation unit 168 may correspond to network 130 of FIG. 1, and content delivery and decoding model 170 may correspond to 5GS delivery unit 150, XR media content delivery unit 148, 2D media decoder 144, and XR viewport rendering unit 142 of FIG. 1.

Game engine 162 receives data 178, including pose model and traces data, game data, and game/engine configuration data, for simulating an extended reality (XR) game using received pose model and traces data. Game engine 162 generates video frames 180 from this received data and provides video frames 180 to model encoding device 164. Model encoding device 164 encodes video frames 180 to generate encoded video frames and v-trace data and provides the encoded video frames and v-trace data 182 to content encoding and delivery model 166.

Content encoding and delivery model uses encoded video frames and v-trace data 182 to generate slice trace (s-trace) data 184 and packets representing encapsulated, encoded slices of the encoded video frames using example configuration parameters 188. Content encoding and delivery model 166 provides s-trace data 184 and the packets to 5GS simulation unit 168. 5GS simulation unit 168 performs a RAN simulation using received s-trace data 184 and the packets and configuration parameters 190 to generate s'-trace data 186. S-trace data 184 represent slices of video data before radio transmission, while s'-trace data 186 represent the slices of video data after radio transmission (which may, for example, be corrupted due to radio transmission). 5GS simulation unit 168 provides s'-trace data 186 and delivered packets encapsulating encoded slices of video data to content delivery and decoding model 170. Content delivery and decoding model 170 performs an example decoding process on the data of the packets.

Using encoded and decoded data from content encoding and delivery model 166 and content delivery and decoding model 170, values representing quality per frame 172 can be generated, to test performance of the RAN simulation performed by 5GS simulation unit 168 and configuration parameters 190. Using a combination/aggregation of individual values of quality per frame 172, an overall quality value 174 can be generated.

Goals may be set for the values for quality per frame 172 and overall quality 174 for adjusting the various configuration parameters. In one example, a goal may be to have no change of video quality as measured by quality per frame 172 and overall quality 174. One or a small number of application metrics may be derived from RAN simulations performed by 5GS simulation unit 168. For each scenario, few v-traces (e.g., one to three) may be performed but over the duration of several hours. Quantization parameters may be unchanged in configuration parameters 188. Several various values for configuration parameters 188 may be adjusted, which may cause bitrate changes as side effects and changes to traffic characteristics. However, no quality changes should be made. There may be a relatively small number of configurations tested, e.g., three to ten.

Game engine 162, model encoding device 164, content encoding and delivery model 166, 5GS simulation unit 168, and content delivery and decoding model 170 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

Based on the concepts discussed above, several parameters are relevant for the overall system design:

Game:
    Type of game
    state of game,
    multi-user actions, etc.

User Interaction:
    6DOF pose based on head and body movement,
    Game interactions by controllers Formats of rasterized video signal. Typical parameters are:
    1.5K×1.5K per eye at 60, 90, 120 fps
    2K×2K at 60, 90, 120 fps
    YUV 4:2:0 or 4:4:4

Encoder configuration
    Codec: H.264/AVC or H.265/HEVC
    Bitrate: Bitrate setting to a specific value (e.g., 50 Mbit/s)
    Rate control: CBR, Capped VBR, Feedback based, CRF, QP
    Slice settings: 1 per frame, 1 per MB row, X per frame
    Intra settings and error resilience: Regular IDR, GDR Pattern, adaptive Intra, feedback based Intra, feedback based predication and ACK-based, feedback-based prediction and NACK based
    Latency settings: P pictures only, look-ahead units
    Complexity settings for encoder Content Delivery
    Slice to IP mapping: Fragmentation
    RTP-based time codes and packet numbering
    RTP/RTCP-based feedback ACK/NACK
    RTP/RTCP-based feedback on bitrate 5G System/RAN Configuration:
  QoS Settings (5QI): GBR, Latency, Loss Rate
  HARQ transmissions, scheduling, etc.
Content Delivery Receiver configuration:
  Loss Detection: sequence numbers
  Delay/Latency handling
  Error Resilience
  ATW
Quality Aspects
  Video quality (encoded)
  Lost data
  Immersiveness Video quality may be impacted by various factors. One factor is coding artifacts based on encoding. Such artifacts may be determined, for example, by the peak signal to noise ratio (PSNR). Another factor is artifacts due to lost packets and the resulting error propagation.

According to the techniques of this disclosure, quality may be modeled for each simulation as a combination of:
  Average PSNR sent from encoding, and
  The percentage of damaged video area
    where a damaged macroblock is defined as
      If it is part of a slice that is lost for this transmission
      If it is correctly received, but it predicts from a wrong macroblock
    Macroblock (or coding tree unit) is correct
      If it is received correctly and it predicts for a non-damaged macroblock
      Predicting from non-damaged macroblock means
        Spatial prediction is correct
        Temporal prediction is correct
    Recovering MBs done by Intra Refresh or by predicting from correct MBs again.

In general, references to macroblocks above and throughout this disclosure refer to macroblocks of ITU-T H.264/AVC. However, it should be understood that the concept of a macroblock may be replaced with a coding unit (CU) or coding tree unit (CTU) of ITU-T H.265/HEVC or ITU-T H.266/VVC, without loss of generality.

In the example of FIG. 2, a source model may be provided based on input that describes a tested game, a pose model, and a statistical model of a video signal that can be used to apply content delivery and encoding procedures. Based on these traces, 3GPP SA4 may define a content encoding and delivery model taking into account a system design based on TR26.928 and as documented in S4-200771. The system model may include encoding, delivery, decoding, and also a quality definition. The system may also provide an interface to RAN simulations. Then, RAN groups may use this model to simulate different traffic characteristics and evaluate different performance options.

Figure 3:
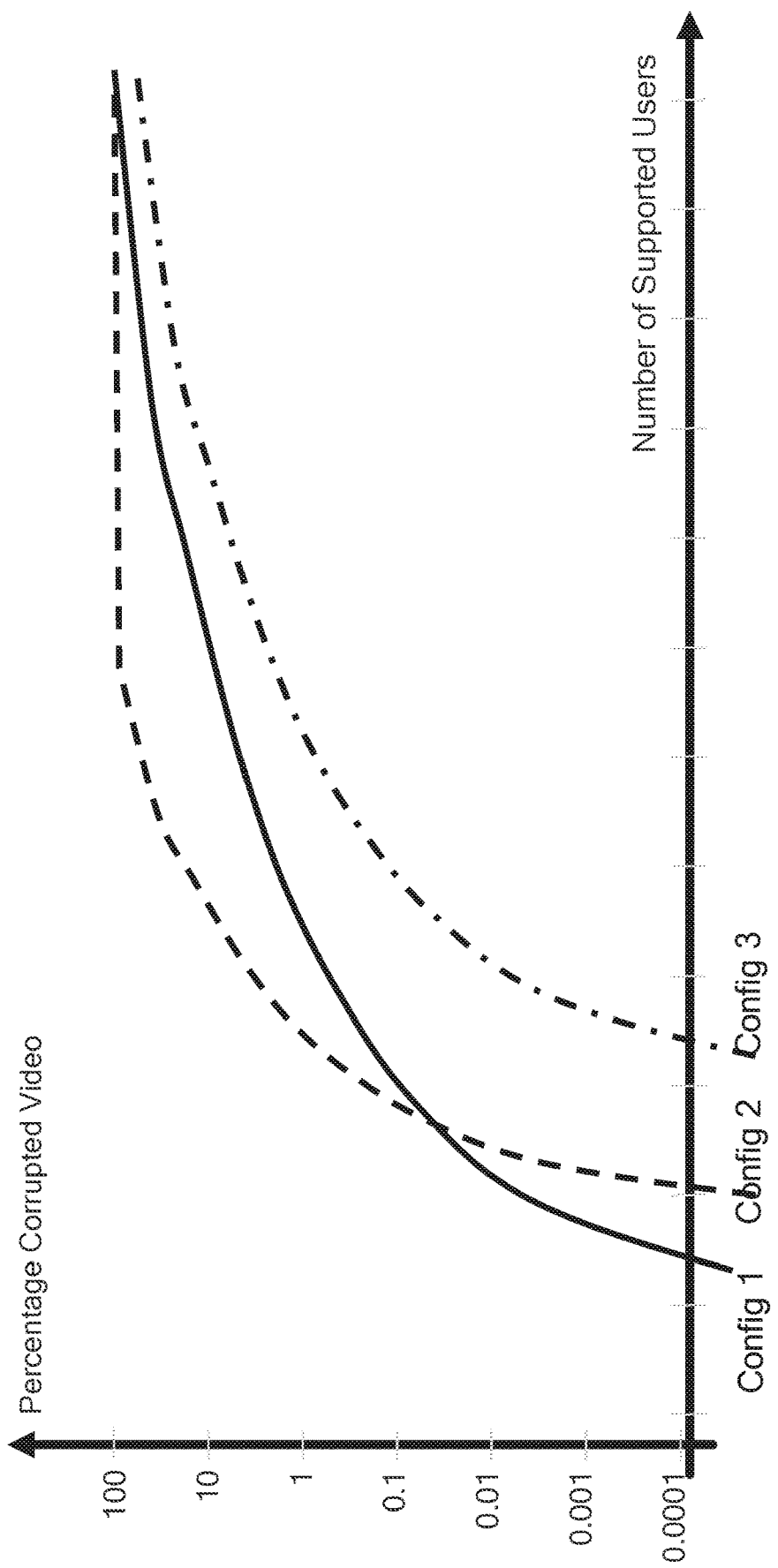
FIGS. 3-5 are example graphs for various radio access network (RAN) simulations as discussed with respect to FIG. 2.

The following elements may be used by system 160 and other systems described herein:
1) V-Traces: Video traces that provide sufficient information from a model encoding to understand the complexity and data rate for an encoding model, also taking into account delivery options such as bitrate control, intra refresh, feedback based error resilience and so on. Details are tbd, but we are currently investigating parameters provided by a model encoding from an x265 encoding run.
2) S-Traces: a sequence of slices as an output of a model encoder. Each slice has assigned:
  a. Associated Frame (Timestamp)
  b. Size of Slice
  c. Quality of Slice (possibly some more information from V-Trace, for example complexity)
  d. Number of Macroblocks (areas covered)
  e. Timing of Slice, e.g., a deadline or at least an origin time stamp.
3) S'Trace:
  a. All information from the S-Trace
  b. Slice loss indicator
  c. Slice delay information FIG. 3 is an example graph for various RAN simulations as discussed with respect to FIG. 2. In this example, the graph represents percent of corrupted video as a function of a number of supported users. The graph of FIG. 3 represents an example graph that may result from the example above in which quantization parameters are unchanged, to prevent change of video quality. To allow for each number of supported users, the various configuration parameters 190 may be modified. As the number of supported users increases, the amount of corrupted video data is expected to increase as well. However, a set of configuration data may be identified that allows a relatively large number of supported users and a relatively small percent of corrupted video, such as "config 3" as shown in FIG. 3.

Referring again to FIG. 2, in another example, video quality may be permitted to change, as measured by quality per frame 172 and overall quality 174. In this example, one or a small number of application metrics may be derived from RAN simulations performed by 5GS simulation unit 168. For each scenario, few v-traces (e.g., one to three) may be performed but over the duration of several hours. Several various values for configuration parameters 188 may be adjusted, including quantization parameters, which may cause bitrate changes as side effects and changes to traffic characteristics. However, no quality changes should be made. There may be a relatively small number of configurations tested, e.g., three to ten.

Figure 4:
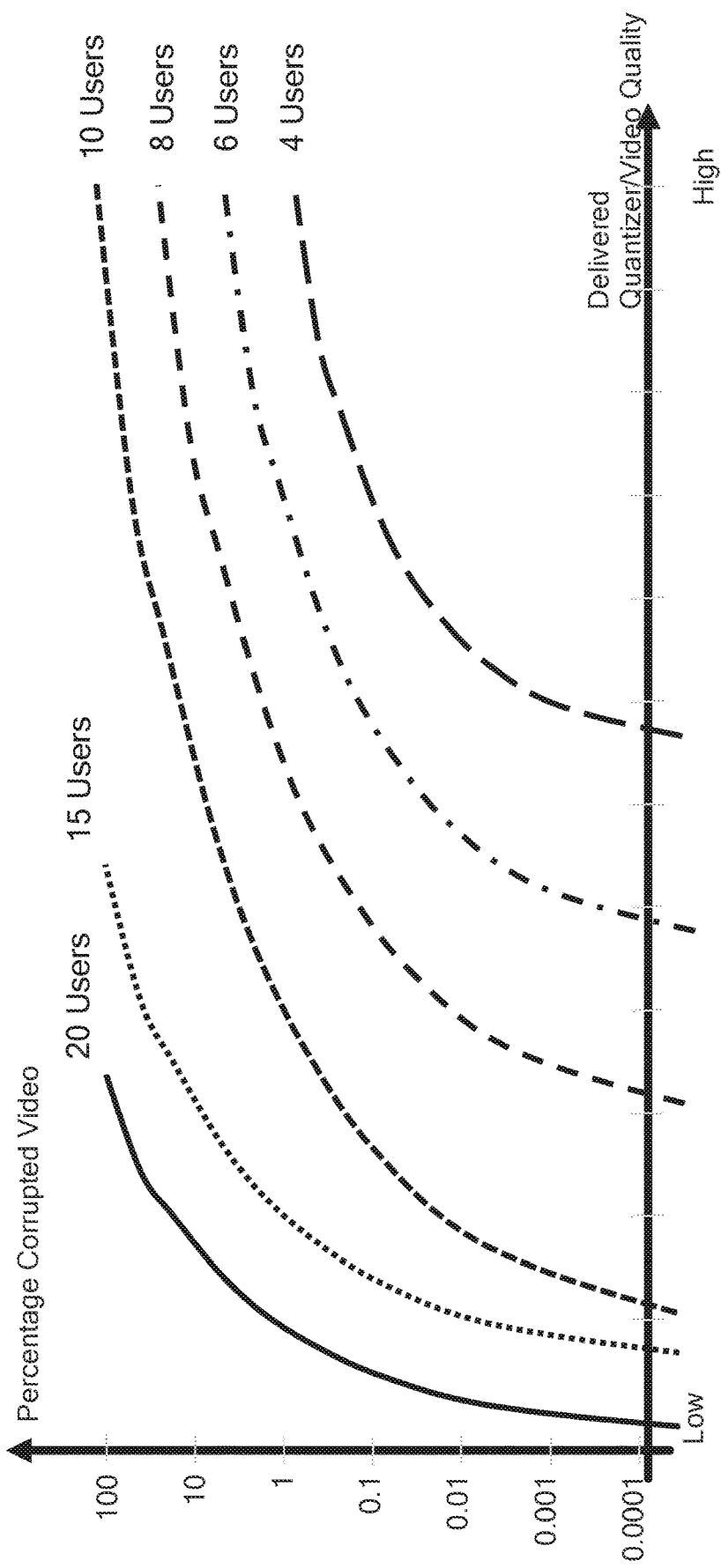
Figure 5:
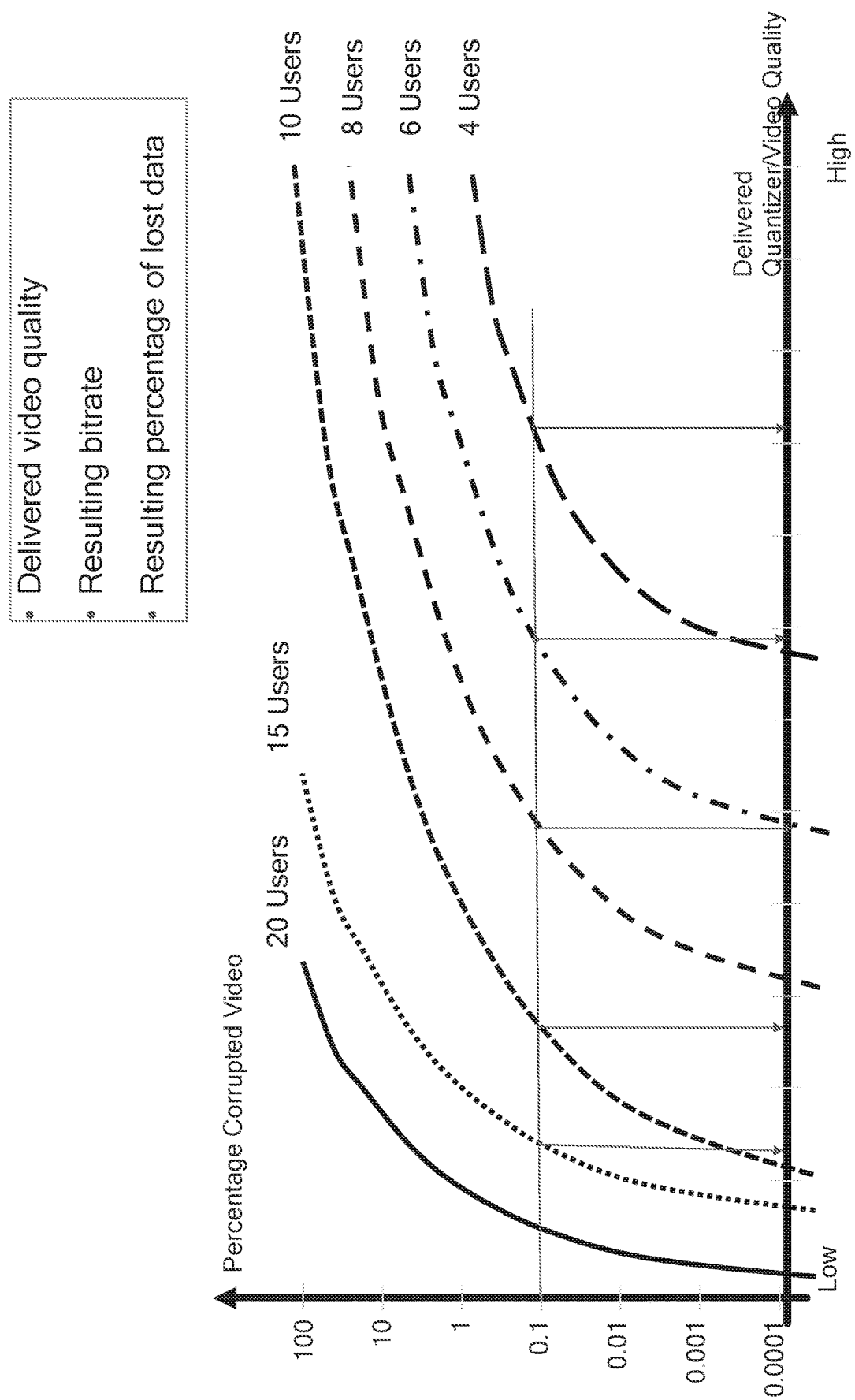

FIGS. 4 and 5 are example graphs for various RAN simulations as discussed with respect to FIG. 2. These example graphs correspond to the example above in which quantization parameters are permitted to change. In these examples, the graphs plot delivered quantizer/video quality data against percentage of corrupted video for a fixed number of users in various scenarios. As shown in FIG. 5, a number of users and configuration parameters may be selected that achieves a high video quality, a low bitrate, and a low percentage of lost data, e.g., at 0.1% corrupted video.

To perform the various test scenarios discussed above, representative source data may be generated to perform v-traces. S-traces may also be performed using content encoding, delivery, and quality, including, for example, on various system designs, delivery parameters, mappings to radio, modeling, and quality definitions. RAN delivery simulations may be based on the S-traces referred to above.

Figure 6:
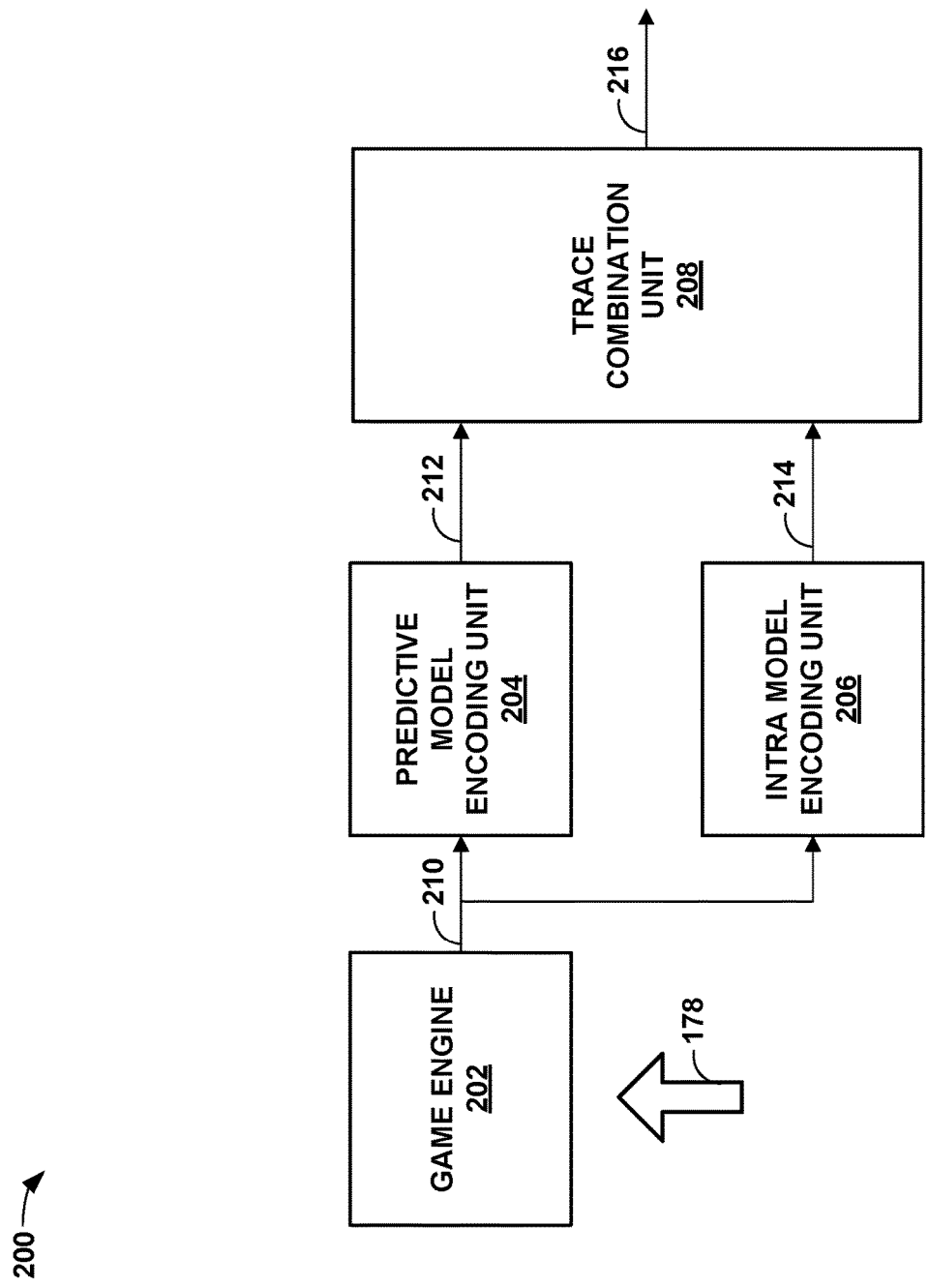
FIG. 6 is a block diagram illustrating an example v-trace system model according to the techniques of this disclosure.

FIG. 6 is a block diagram illustrating an example v-trace system model 200 according to the techniques of this disclosure. V-trace system model 200 represents a model for evaluating source video encoding complexity. In this example, v-trace system model 200 includes game engine 202, predictive model encoding unit 204, intra model encoding unit 206, and trace combination unit 208. V-trace system model 200 may generally correspond to a portion of system 160 of FIG. 2. For example, game engine 202 may generally correspond to game engine 162 of FIG. 2, and predictive model encoding unit 204, intra model encoding unit 206, and trace combination unit 208 may correspond to model encoding device 164. Game engine 202 receives input data 178 including pose and model trace data, game data, and game configuration data.

Game engine 202 generates video frames 210 and provides video frames 210 to each of predictive model encoding unit 204 and intra model encoding unit 206. Video frames 210 may be, for example, extended reality (XR) split data at 60 fps, with one frame per eye to achieve the XR effect. In this example, v-trace system model 200 includes two tracks: one for intra-prediction and one for inter-prediction. In video coding, intra-prediction is performed by predicting blocks of video data with neighboring, previously decoded blocks of the same frame, and inter-prediction is performed by predicting blocks of video data using reference blocks of previously decoded frames.

Predictive model encoding unit 204 may generate VP-trace data 212, while intra model encoding unit 206 may generate VI-trace data 214. Trace combination unit 208 receives VP-trace data 212 and VI-trace data 214 and generates V-trace data 216. V-trace data 216 may be formatted according to a passlogfile format of FFMPEG after a coding pass. Such formats are described in, e.g., ffmpeg.org/wiki/Encode/H.264 and slhck.info/video/2017/03/01/rate-control.html. Trace combination unit 208 may also use configuration parameters "-pass[: stream_specifier] n (output,per-stream)" and "-passlogfile." Pseudocode for an example algorithm for generating v-trace data 216 in this format is shown below:

```
void ff_write_pass1_stats (MpegEncContext *s) {
    snprintf(s->avctx->stats_out, 256,
    "in:%d out:%d type:%d q:%d itex:%d ptex:%d mv:%d misc:%d"
    "fcode:%d bcode:%d mc-var:%"PRId64" var:%"PRId64" icount:%d skipcount:%d hbits:%d;\n",
    s->current_picture_ptr->f->display_picture_number,
    s->current_picture_ptr->f->coded_picture_number,
    s->pict_type,
    s->current_picture.f->quality,
    s->i_tex_bits,
    s->p_tex_bits,
    s->mv_bits,
    s->misc_bits,
    s->f_code,
    s->b_code,
    s->current_picture.mc_mb_var_sum,
    s->current_picture.mb_var_sum,
    s->i_count, s->skip_count,
    s->header_bits);
}
```

As an alternative to ITU-T H.264/AVC, video data may be coded using ITU-T H.265/HEVC or other video coding standards. With respect to the example of H.265, example log files are described at x265.readthedocs.io/en/default/cli.html#input-output-file-options. Such log files may include parameters as follows:

Encode Order: The frame order in which the encoder encodes.
Type: Slice type of the frame.
POC: Picture Order Count—The display order of the frames.
QP: Quantization Parameter decided for the frame.
Bits: Number of bits consumed by the frame.
Scenecut: 1 if the frame is a scenecut, 0 otherwise.
RateFactor: Applicable only when CRF is enabled. The rate factor depends on the CRF given by the user. This is used to determine the QP so as to target a certain quality.
BufferFill: Bits available for the next frame. Includes bits carried over from the current frame.
BufferFillFinal: Buffer bits available after removing the frame out of CPB.
Latency in terms of number of frames between when the frame was given in and when the frame is given out.
PSNR: Peak signal to noise ratio for Y, U and V planes.
SSIM: A quality metric that denotes the structural similarity between frames.
Ref lists: POCs of reference pictures in lists 0 and 1 for the frame.
Several statistics about the encoded bitstream and encoder performance are available when --csv-log-level is greater than or equal to 2:

In still other examples, other video codecs, such as ITU-T H.266/Versatile Video Coding (VVC) may be used. Similar sets of data may be generated for analysis using VVC or other such video codecs.

Trace combination unit 208 may generate v-trace data 216 according to certain v-trace generation principles. Certain v-trace generation principles are described at slhck.info/video/2017/02/24/crf-guide.html. Trace combination unit 208 may use H.264/AVC with x264 in FFMPEG and H.265/HEVC with x265 in FFMPEG. Trace combination unit 208 may use a near lossless constant quality mode, with options including:

Constant QP
Constant rate factor
Recommendations according to slhck.info/video/2017/02/24/crf-guide.html for QP/CRF setting:
For x264, typical values are between 18 and 28. The default is 23. 18 should be visually transparent.
For x265, typical values are between 24 and 34. The default is 28. 24 should be visually transparent.
A change of ±6 should result in about half/double the file size, although results may vary.
Multiple CRFs may be run in parallel from one output.
It may be determined whether discussions in slhck.info/video/2017/02/24/crf-guide.html also apply for XR and video games.

Game engine 202, predictive model encoding unit 204, intra model encoding unit 206, and trace combination unit 208 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

Figure 7:
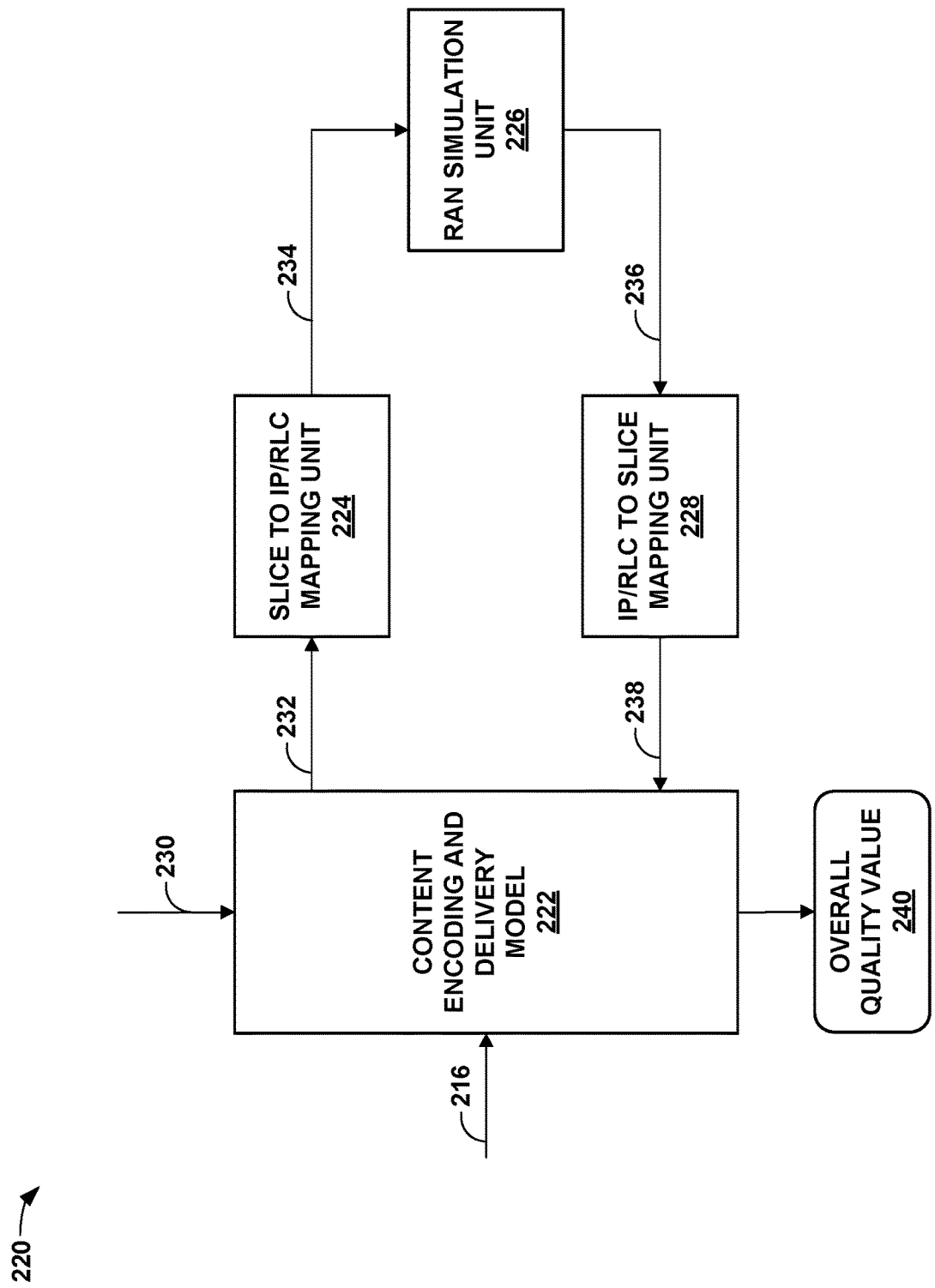
FIG. 7 is a block diagram illustrating an example system for performing RAN simulations according to the techniques of this disclosure.

FIG. 7 is a block diagram illustrating an example system 220 for performing RAN simulations according to the techniques of this disclosure. System 220 includes content encoding and delivery model 222, slice to Internet protocol packet/radio link control (IP/RLC) mapping unit 224, RAN simulation unit 226, and IP/RLC to slice mapping unit 228. System 220 may generally correspond to a portion of system 160 of FIG. 2. For example, content encoding and delivery model 222 may correspond to content encoding and delivery model 166 of FIG. 2, and slice to IP/RLC mapping unit 224, RAN simulation unit 226, and IP/RLC mapping unit 228 may correspond to 5GS simulation unit 168 of FIG. 2.

In this example, content encoding and delivery model 222 receives v-trace data 216, which includes data representing encoding of frames of video data, from trace combination unit 208 (FIG. 6). Content encoding and delivery model 222 also receives global configuration data 230. Using global configuration data 230 (which may correspond to configuration parameters 188 of FIG. 2), content encoding and delivery model 222 may encode frames of video data to form encoded slices of video data, and to form s-trace data 232 representing the encoded slices. Content encoding and delivery model 222 may produce the slices for a certain time, where each slice corresponds to a sequence of macroblocks (ITU-T H.264/AVC) or largest coding units/coding tree units (ITU-T H.265/HEVC).

Slice to IP/RCL mapping unit 224 may use real-time transport protocol (RTP) to form IP packets and RLC fragments from the slices of s-trace data 232. Slice to IP/RLC mapping unit 224 may be configured with IP packet and payload size information for forming the packets and fragments. In general, if a packet is lost, the entire slice to which the packet corresponds is also lost. Slice to IP/RLC mapping unit 224 produces p-trace data 234, which slice to IP/RLC mapping unit 224 provides to RAN simulation unit 226. RAN simulation unit 226 may be configured with delay requirements and loss requirements for each slice/packet and determine, through a RAN simulation, whether each slice is received or lost at the end of the simulation, as well as latency values or received time stamp values for each slice.

RAN simulation unit 226 may provide P'-trace data 236 including data representing whether slices are received or lost and the latencies/receive times for the received slices to IP/RLC to slice mapping unit 228. IP/RLC to slice mapping unit 228 provides s'-trace data 238 to content encoding and delivery model 222. Content encoding and delivery model 222 may determine overall quality value 240 by comparing video data decoded prior to the RAN simulation to decoded video data following the RAN simulation.

RAN simulation unit 226 may be configured according to a maximum delay requirement for each slice downlink. For example, there may be a MAC to MAC 10 ms deadline and a no loss requirement from outside. For an uplink, there may be tracking, sensor, and pose information, content delivery uplink information, and pose update traffic (e.g., at a periodicity of 1.25 ms or 2 ms). The system may determine how pose frequency impacts quality, which may depend on XR service type. For gaming, pose frequency may have a large impact. Pose and game action may also be synchronized.

RAN simulation options may include open loop and closed loop options. For open loop, for an entire V-trace, the system may generate s-trace data, p-trace data, RAN simulations one way, p'-trace data, and s'-trace data, and then perform a quality evaluation, in the form of, e.g., overall quality value 240. For closed loop, for every v-trace entry, the system may generate s-trace data, p-trace data, RAN simulations one way, p'-trace data, and s'-trace data, and then feedback the resulting data into a next s-trace, and generate quality evaluations in the form of overall quality value 240.

Content encoding and delivery model 222, slice to IP/RLC mapping unit 224, RAN simulation unit 226, and IP/RCL to slice mapping unit 228 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

Figure 8:
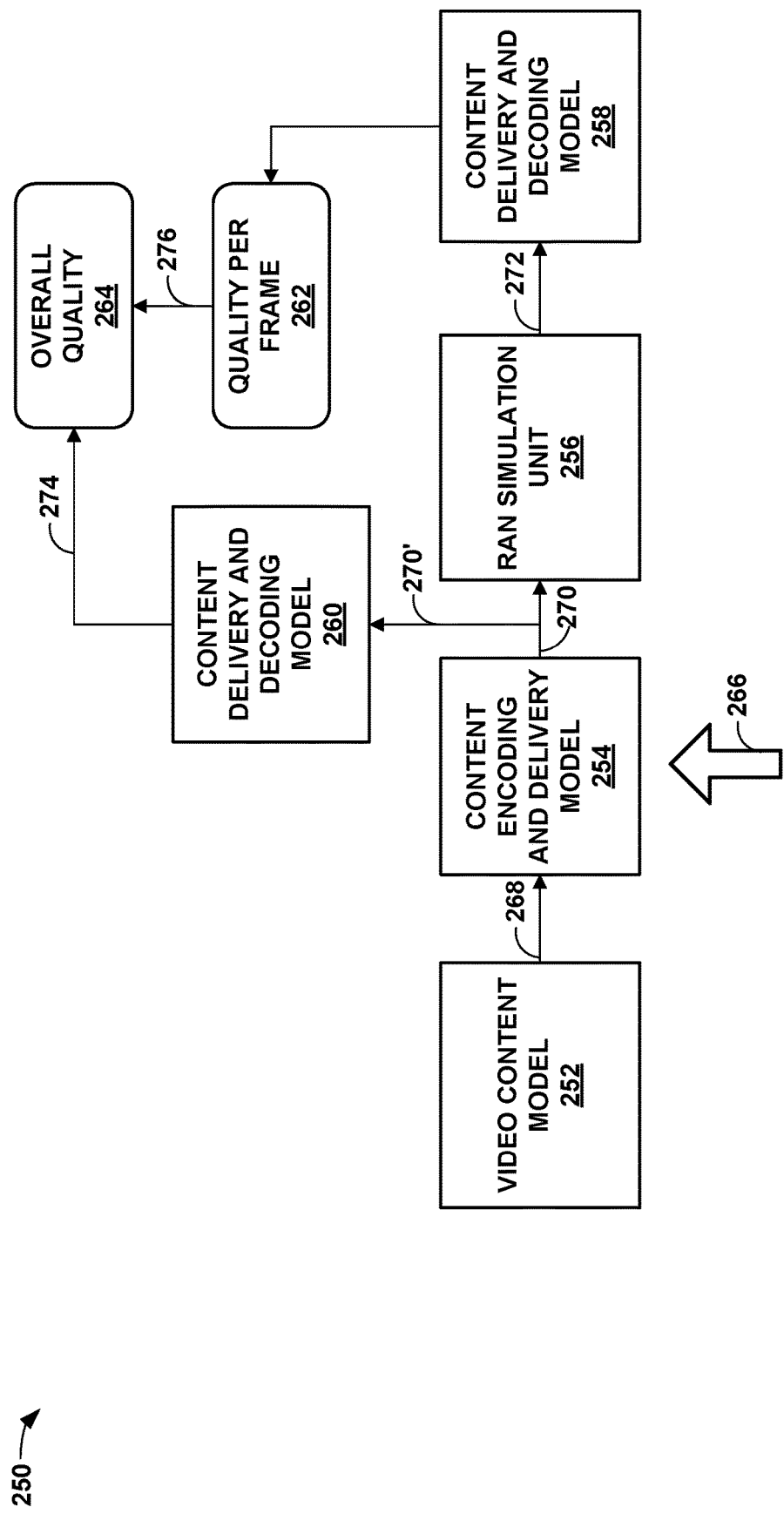
FIG. 8 is a block diagram illustrating an example system for measuring performance of XR content delivery configuration and modeling according to the techniques of this disclosure.

FIG. 8 is a block diagram illustrating an example system 250 for measuring performance of XR content delivery configuration and modeling according to the techniques of this disclosure. System 250 includes video content model 252, content encoding and delivery model 254, radio access network (RAN) simulation unit 256, content delivery and decoding model 258, and content delivery and decoding model 260. These elements of system 250 may correspond to respective components of system 160 of FIG. 2. For example, video content model 252 may correspond to game engine 162 and model encoding device 164 of FIG. 2, content encoding and delivery model 254 may correspond to content encoding and delivery model 166 of FIG. 2, RAN simulation unit 256 may correspond to 5GS simulation unit 168, and content delivery and decoding model 258 may correspond to content delivery and decoding model 170 of FIG. 2.

In this example, decoded media data is compared before and after having passed through RAN simulation unit 256. Video data from content delivery and decoding model 258, which has passed through RAN simulation unit 256, is assessed to determine values for quality per frame 262. Decoded media data from content delivery and decoding model 260 and the values for quality per frame 262 are used to determine overall quality data 264.

In particular, video content model 252 provides v-trace data 268 and encoded video data to be transmitted to content encoding and delivery model 254. Content delivery model 254 receives global configuration data 266 and uses global configuration data 266 to encode and deliver the video data corresponding to v-trace data 268. Global configuration data 266 may include, for example, bitrate control information (e.g., to select one or more of constant quality, constant bitrate, feedback-based variable bitrate, or constant rate factor), slice settings (number of slices, maximum slice size), error resilience (frame-based, slice-based, regular intra refresh, feedback-based intra refresh, or feedback-based prediction), and feedback data (off, statistical, or operational). The maximum slice size setting may depend on various statistics, including the number of slices, which may vary.

Content encoding and delivery model 254 outputs s-trace data 270 to RAN simulation unit 256 and s'-trace data 270' to content delivery and decoding model 260. RAN simulation unit 256 performs a RAN simulation on s-trace data 270 and outputs s'-trace data 272 to content delivery and decoding model 258. Content delivery and decoding model 260 outputs q-trace data 274, and content delivery and decoding model 258 outputs values for quality per frame 262, yielding q'-trace data 276. Overall quality data 264 may be one or more quality measures for an entire video sequence (e.g., an aggregation of qualities for individual video frames).

Various content encoding considerations may influence encoding of video data corresponding to v-trace data 268 to form s-trace data 270. In one example, an objective is to have consistent quality, use ITU-T H.265/HEVC encoding, form a fixed number of slices, one slice being encoded using intra prediction in opportunistic mode, and no feedback. In this example, the bitrate control may be the use of a constant rate factor of 28, a number of slices of 10, a periodic intra refresh value of 10, period intra refresh and reference picture invalidation, and feedback being off. To create slice sizes, content encoding and delivery model 254 may generate 10 slices for every video frame, use a constant rate factor of 28 (where ±6 results in about half/double the frame size, 12% decrease/increase for each +/−), one intra slice is assumed, based on VI-trace (i.e., 10% of adjusted I-frame size), and 9 inter slices are generated based on VP-trace (where two aspects may be considered: size of frame (10%) and statistical variation).

RAN simulation unit 256 may maintain state data for each macroblock (ITU-T H.264/AVC) or coding tree unit (ITU-T H.265/HEVC), such as: damaged (lost or predicted from damaged area, whether temporal or spatial), or correct. RAN simulation unit 256 may provide feedback to content encoding and delivery model 254, including data representing numbers of lost or damaged blocks of video data. Content encoding and delivery model 254, in turn, may integrate the feedback for subsequent encoding. For example, whether statistical or operational, content encoding and delivery model 254 may react to a slice loss. In response, content encoding and delivery model 254 may adjust bitrate (e.g., get an encoding bitrate and adjust quantization parameters up or down, where +/−1 may yield a 12% impact). Content encoding and delivery model 254 may add an intra-predicted slice if a slice is lost (significantly more intra-predicted data may be added in the case of a reported loss. The intra-predicted slice may cover a large area, depending on motion vector activity. In some cases, content encoding and delivery model 254 may predict from acknowledged regions only, which may cause a statistical increase for frame size for lost slices, as the latest slice may not be used for prediction.

S-trace data 270 may be formatted to include data for a timestamp representing an associated frame, a size of a slice, a quality of the slice (which may include more information from the v-trace, for example, complexity), a number of macroblocks (for ITU-T H.264/AVC) or coding tree units (for ITU-T H.265/HEVC), and/or a timing of the slice (e.g., a deadline for receipt of the slice). S'-trace data 270' and 272 may be formatted to include all information from the format for s-trace data 270 discussed above, and in addition, data representing slice loss and/or slice delay.

There may be a constant deadline for each slice, which can be set to a higher number. For example, for 60 fps video data staggered by each eye, i.e., 120 fps video data, there may be a desired latency set to 7 ms. A drop deadline can be set differently, and may be useful, but should not complicate the RAN simulation.

Content decoding considerations to produce Q-trace data 274 from s'-trace data 270' may be used to take the results from RAN simulations performed by RAN simulation unit 256 and to map these simulation results to estimated values for quality per frame 262. When determining values for quality per frame 262, slice considerations may include, for example, quality of encoded slices that are received, numbers of lost slices, which slices are so degraded in quality as to be considered lost, and delayed slices, which may be considered as lost. Other considerations may include error propagation (e.g., prediction of a slice from a degraded quality slice or lost slice), complexity of frame/slice may determine error propagation (how fast incorrect data spreads over frames), new intra reset quality, and percent of correct/wrong data for each frame and for different configurations.

A metric for determining q-trace data 274 may be a percentage of incorrect data, which may impact lost/error propagation. Q-trace data 274 format may include data representative of encoding quality, resulting quality after delivery (percentage of degraded data), and/or data rate of frames.

System 250 may maintain a state for each macroblock (ITU-T H.264/AVC) or coding tree unit (CTU) (ITU-T H.265/HEVC) of either "damaged" or "correct." If a macroblock/CTU is damaged, system 250 may determine whether the macroblock/CTU is part of a slice that is lost for this transmission or if the macroblock/CTU is correctly received by predicted from an incorrectly decoded/lost region of another slice/frame. If the macroblock/CTU is correct, system 250 determines that the macroblock/CTU was received correctly and that it is predicted from a non-damaged region of another slice/frame. Predicting from a non-damaged region of another slice/frame means that spatial prediction is correct, temporal prediction is correct, or macroblocks/CTUs are recovered correctly using intra-refresh and prediction from correct regions of other slices/frames following the intra-refresh.

System 250 may determine overall quality value 264 by averaging encoding quality (e.g., average over quantization parameters, and possibly convert to peak signal to noise ratio (PSNR)), average incorrect video data (e.g., an average incorrect number of video frames and/or slices), and/or if needed, a multiplication/combination/aggregation. 3GPP SA4 defines a constant rate factor (CRF) based encoding model with a specific quality factor (e.g., using FFMPEG default of 28). Different configurations for error resilience may be applied. Criteria for simulations may be the percentage of incorrect video area such that at most one macroblock/CTU for every X (e.g., 60) seconds is wrong. For example, if 4096×4096 is used at 60 fps, then this results in 10e-6 damaged area in average.

The models discussed above may work for pixel-based split rendering and/or cloud gaming. Conversational applications, video streaming applications (e.g., Twitch.tv), and others may also be used.

Video content model 252, content encoding and delivery model 254, RAN simulation unit 256, content delivery and decoding model 258, and content delivery and decoding model 260 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

System 250 represents an example content modeling based on discussion in S4-200771. This modeling includes a v-model input, global configuration for an encoder, statistical or dynamic feedback from content delivery receiver, a decoding model and a quality model.

Content encoding by content encoding and delivery model 254 may be modeled as follows:
For frame i from V-Trace (based on sample time)
    Read frame i from V-Trace (timestamp)
    Read latest dynamic information from dynamic status info
    Do a model encoding (based on input parameters)
    For slice s=1, 2, . . . , S
        Drop slice s with associated parameters
        New slice becoming available creates IP packets
        For IP packet p=1, 2, . . . , P
            Drop IP packet with associated parameters and with timestamp to S-Trace 1, but also parameters such as slice number Configuration parameters of global configuration data 266 may include:
Input: Global configuration
    Bitrate Control: Constant Quality, Constant Bitrate, Feedback-based Variable Bitrate, Constant Rate Factor 28
    Slice Setting (number of slices 10, maximum slice size)
    Error Resilience, Frame-based, Slice-based, Periodic Intra Refresh 10, Feedback-based intra refresh, Feedback-based prediction (NVIDIA: Period Intra Refresh, Reference Picture Invalidation)

Input: Dynamic per slice information
   off
   statistically for bitrate or losses with some delay
   operational for bitrate or losses with some delay
Aspects of model encoding may include:
Impacts of QP settings and intra ratio and slice settings
Feedback
   Bitrate adjustments: Encoder gets an encoding bitrate and adjusts QP (see +/−1→12%)
   Add Intra in case of a lost slice: significantly more intra added in case of a reported loss. Intra covers large area (depending on motion vector activity)
   Predicting from ACK only: statistical increase for frame size for lost slices, as not the latest one can be used
Slice settings Decoding emulation by content delivery and decoding model 258 may be based on the delay and/or loss of slices. Late and lost slices may be considered unavailable and cause errors (e.g., in decoding of subsequent frames/slices that refer to the lost or late slices for inter-prediction).

RAN simulation unit 256 may emulate a RAN simulation based on existing 5Qis.

Quality evaluation may be based on two aspects, including encoding quality and quality degradation due to lost slices. The following simulation may be used to identify damaged macroblocks (or coding tree units or coding units, in ITU-T H.265/HEVC):

Keep a state for each macroblock (or CU/CTU)
   Damaged
   Correct
Macroblock is damaged
   If it is part of a slice that is lost for this transmission
   If it is correctly received, but it predicts from a wrong macroblock
Macroblock is correct
   If it is received correctly and it predicts for a non-damaged macroblock
Predicting from non-damaged macroblock means
   Spatial prediction is correct
   Temporal prediction is correct
   Recovering MBs done by Intra Refresh and predicting from correct MBs again.

Depending on the configuration and the setting of the delivered video quality, different results may be obtained. A quality threshold may for example be to have at most 0.1% of damaged video area. Also, the quality of the original content may be a threshold.

Figure 9:
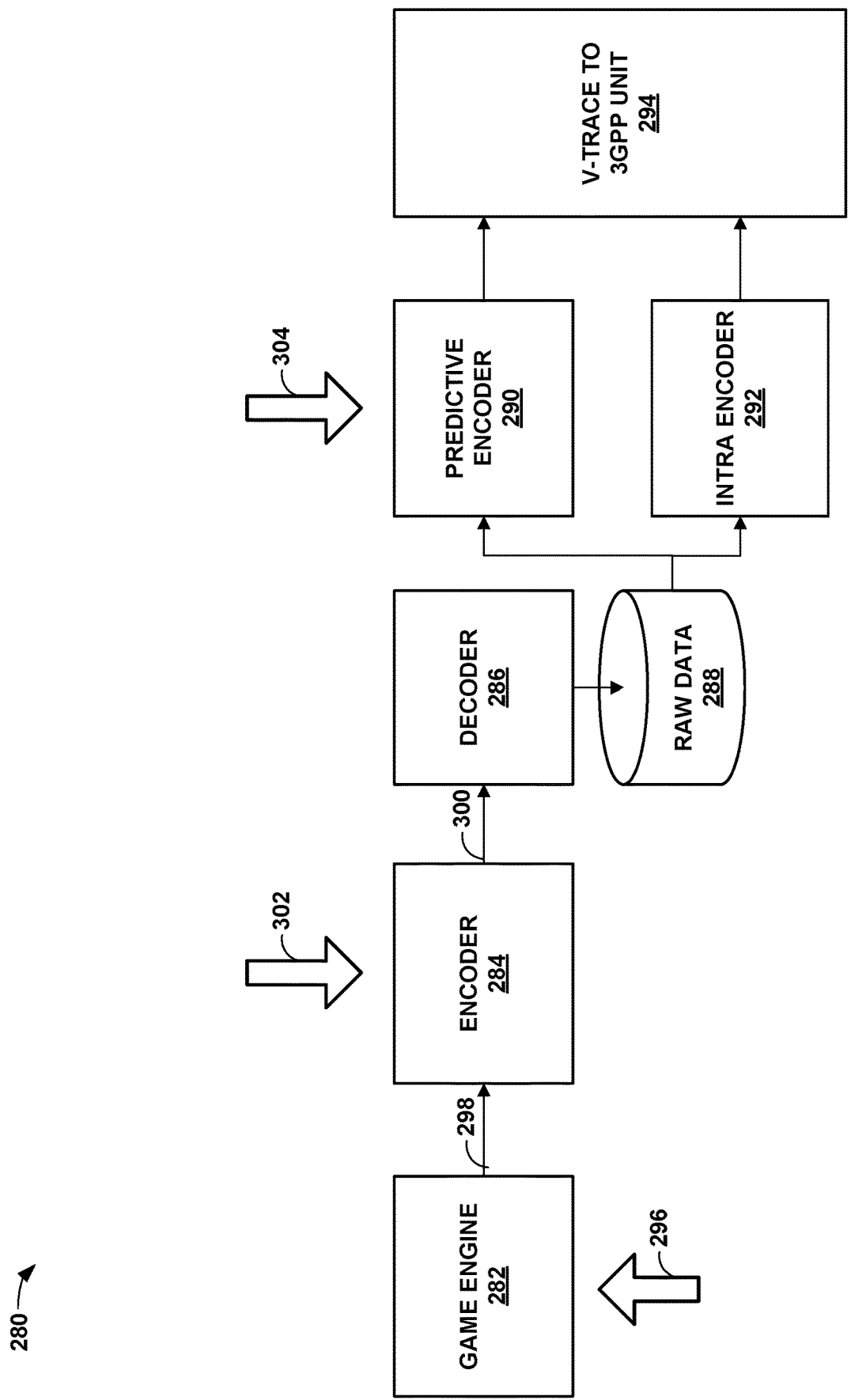
FIG. 9 is a block diagram illustrating an example pipeline for real-time generation of v-trace data according to the techniques of this disclosure.

FIG. 9 is a block diagram illustrating an example pipeline 280 for real-time generation of v-trace data according to the techniques of this disclosure. Pipeline 280 includes game engine 282, encoder 284, decoder 286, raw data storage 288, predictive encoder 290, intra encoder 292, and v-trace to 3GPP unit 294. Components of pipeline 280 may correspond to respective components of system 160 of FIG. 2. For example, game engine 282 may correspond to game engine 162 of FIG. 2, encoder 284 may correspond to model encoding device 164 of FIG. 2, and decoder 286, raw data 288, predictive encoder 290, intra encoder 292, and v-trace to 3GPP unit 294 may correspond to content encoding and delivery model 166 of FIG. 2.

Game engine 282 receives input data 296 including pose model and trace data, game data, and game configuration data. Game engine 282 generates video frames 298 from input data 296. Encoder 284 (which may be an NVIDIA NVENC encoder) encodes video frames 298 using configuration data 302 to generate video bitstream 300. Encoder 284 may operate at 600 GByte per hour, and may run over several hours. Decoder 286 may be an FFMPEG decoder, and decodes video bitstream 300 to generate decoded video data stored as raw data 288 in a computer-readable medium, such as a hard disk, flash drive, or the like. Predictive encoder 290 and intra encoder 292 receive configuration data 304 and encode raw data 288 to form respective VP-trace and VI-trace data. V-trace to 3GPP unit 294 generates v-trace data from the VP-trace and VI-trace data.

As shown in FIG. 9, encoder 284 may generate bitstream 300, as discussed above, and V-trace to 3GPP unit 294 may generate v-trace data. V-Trace generation may be initiated by using a high-quality output of game engine 282 and encoded by encoder 284 using ITU-T H.264(AVC) for a model game and a repeatable trace. Decoder 286 may decode this information into a 2K×2K at 120 fps source frames. This sequence may be sent through a model encoder including predictive encoder 290 and intra encoder 292, for identifying the impacts of different parameter settings. The following x.265 parameters may be used initially:

--input viki.yuv (4:2:0)
   --profile, -P main10
   --input-res 2048×2048
   --fps 120 fps, 60 fps, 30 fps
   --psnr
   --ssim
   --frames 500 (initial testing)
   --bframes 0
   --crf 22, 25, 28, 31, 34
   --csv logfile.csv
   --csv-log-level 2
   --log-level 4
   --numa-pools "8"
   --keyint, −I 1 and −1
   --slices 1, 128 (2048), 8 (for 2048)
   --output rvrviki.h265
   --rc-lookahead 0/1

Based on these 180 encoding runs, a good encoder modeling is expected such that only a subset of runs are necessary for longer game sequences.

Parameters for generation of the V-trace data in this example may include a duration of a P-trace (e.g., several hours), various games being executed by game engine 282, pose traces, settings for encoder 284 (with the goal being, e.g., simple, high quality FFMPEG decodable video data), and FFMPEG configuration data. Four FFMPEG decoder configurations may be tested, and in some examples, pipelined in parallel:

HEVC at CRF 28, I-PPP
   HEVC at CRF 28, I-IIIIIII
   AVC with CRF 23, I-PPP
   AVC with CRF 23, x265.readthedocsio/en/default/cli.html# describes possible configuration parameters. These parameters may be used to configure rvrplugin.ini with 2048×2048 resolution, 5 ps, and generated bitstream using ITU-T H.264/AVC encoder at server side, which may run at 60 or 120 fps. This data may be re-encoded with crf-24 and updated PSNR and SSIM values. Initial command-line arguments may include the following:

ABR(Average bit rate): x265.exe --input viki.yuv --input-res 1440×1440 --fps 120 --psnr --ssim --frames 500 --bframes 0 --bitrate 600000 --csv logfile.csv --csv-log-level 2 --log-level 4 --numa-pools "8" --keyint 1 --output rvrviki.h265
   CRF(Constant quality variable bit rate): x265.exe --input viki.yuv --input-res 1440×1440 --fps 120 --psnr --ssim --frames 500 --bframes 0 --crf 24 --csv logfilecrf.csv --csv-log-level 2 --log-level 4 --numa-pools "8" --keyint 1 --output rvrviki.h265

Game engine 282, encoder 284, decoder 286, predictive encoder 290, intra encoder 292, and v-trace to 3GPP unit 294 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

Figure 10:
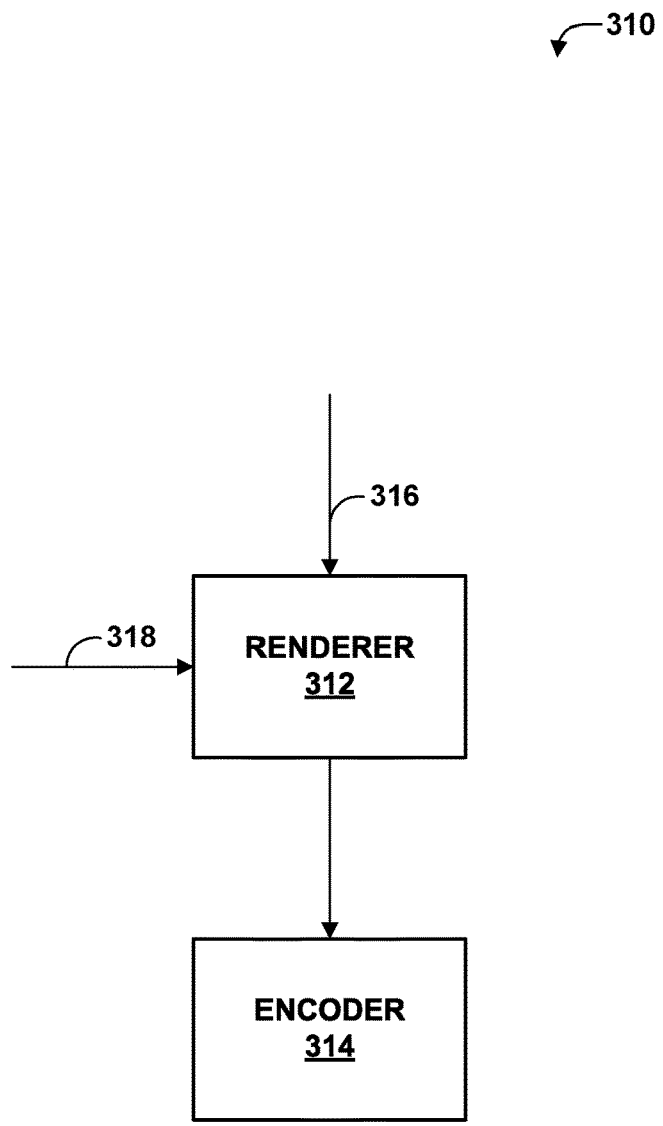
FIG. 10 is a block diagram illustrating an example rendering and encoding system according to the techniques of this disclosure.

FIG. 10 is a block diagram illustrating an example rendering and encoding system 310 according to the techniques of this disclosure. In this example, system 310 includes renderer 312 and encoder 314. Renderer 312 receives content changes 318 and pose information 316 to generate rendered video data, e.g., at a frame rate of 60 or 120 fps. Pose information 316 may be provided at a very high frequency with a 2.5 ms delay. Every ¹⁄₆₀ Hz, renderer 312 may take a latest pose from pose information 316, render video data from content changes 318, and send a rendered image to encoder 314 for encoding. Encoder 314 may queue the encode call and then render the image.

Encoder 314 may encode video data using ITU-T H.265/HEVC, e.g., "x265.exe." Encoder 314 may operate with the following command line options:
- --input viki.yuv (4:2:0)
- --profile, -P main10
- --input-res 1440×1440 (2048×2048)
- --fps 120 fps, 60 fps, 30
- --psnr
- --ssim
- --frames 500 (initial testing)
- --bframes 0
- --crf 22, 25, 28, 31, 34
- --csv logfile.csv
- --csv-log-level 2
- --log-level 4
- --numa-pools "8"
- --keyint, -I 1 and -1
- --slices 1, 90 (for 1440), 128 (2048), 6 (for 1440), 8 (for 2048)
- --output rvrviki.h265
- --analysis-save-reuse-level 10
- --rc-lookahead 0/1

Encoder 314 need not use "--frame-dup disabled," "--constrained-intra," and "--no-deblock."

Renderer 312 and encoder 314 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

Figure 11:
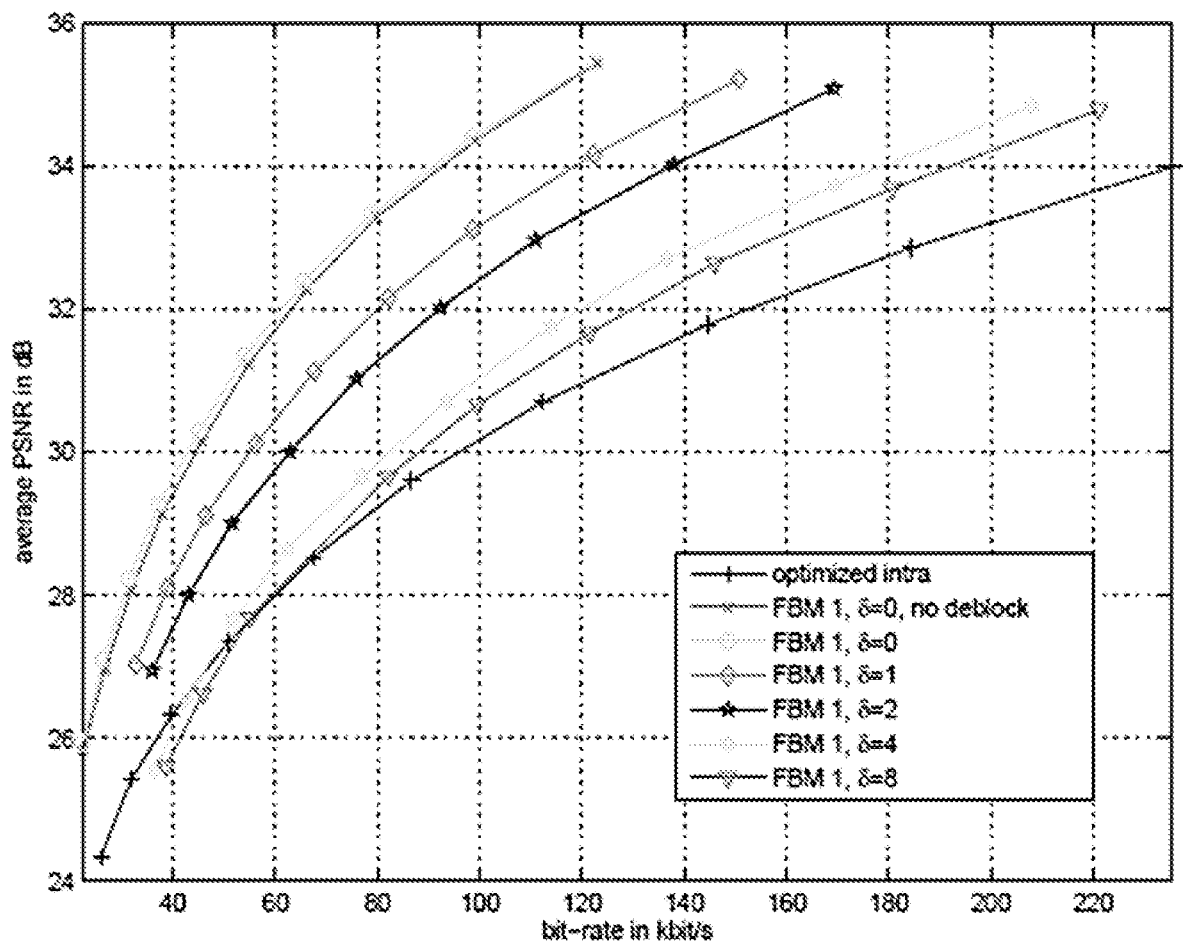
FIG. 11 is a graph illustrating an example comparison between average PSRN and PSNR in decibels (dB) for various encoder parameters.

FIG. 11 is a graph illustrating an example comparison between average PSRN and PSNR in decibels (dB) for various encoder parameters. In this example, there is roughly a 25% increase from 0 to 1, roughly a 50% increase from 0 to 2, roughly a 75% increase from 0 to 3, and roughly a 100% increase from 0 to 4. Such increases may depend on picture type. For example, if a video sequence generates many intra-predicted frames regardless of configuration, the increase may be less, and very static content may cause less of an increase. This can be used to model invalidated reference operation.

Error propagation may also be modeled. As a basic principle, error in a slice may destroy the slice in the current picture (e.g., X % damaged). As the next frame references this frame, error may propagate both temporally as well as spatially, until an intra frame is received or an intra slice for the region, the region may be damaged, and the error may propagate spatially to the next frame. This may depend on the amount of motion vectors, e.g., in the next frame, if more than X % are damaged, unless intra is applied. In the next frame, the size of the damaged area may grow. Intra prediction may remove the error propagation, but with multiple reference frames, the damaged area may be brought back.

Figure 12:
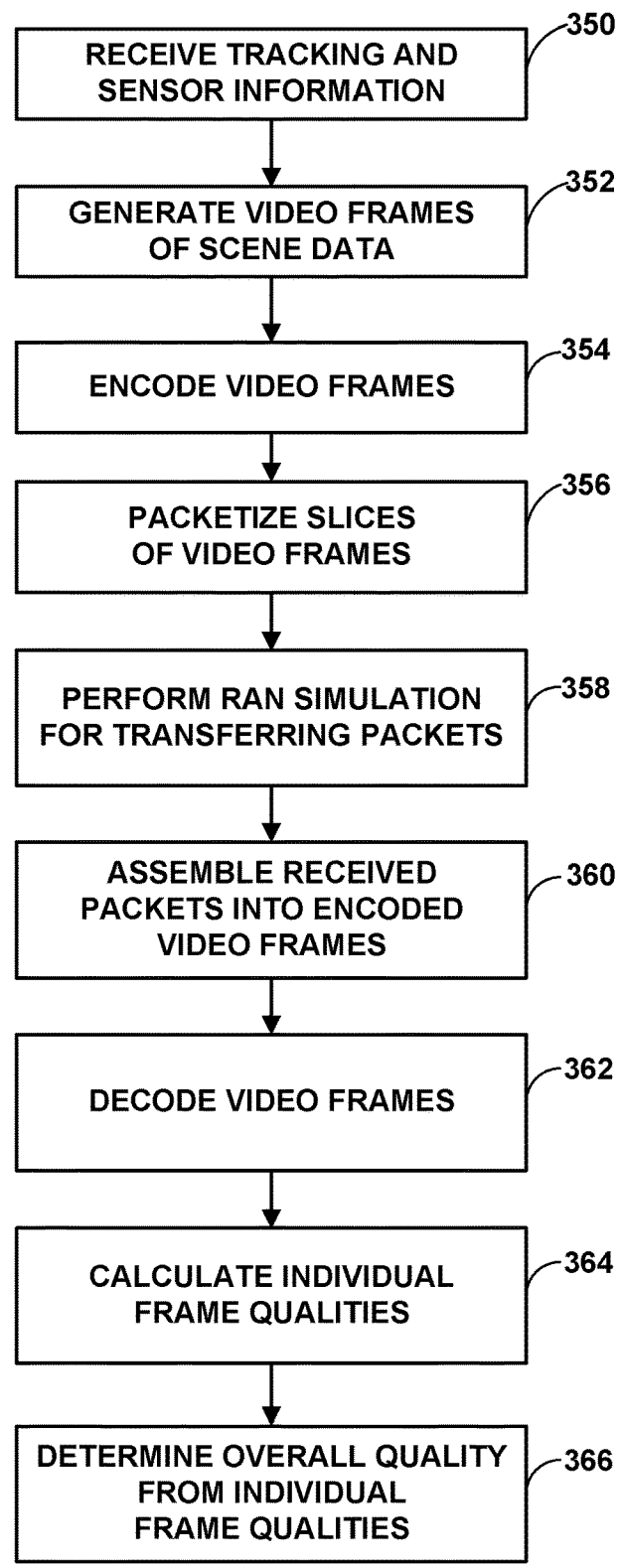
FIG. 12 is a flowchart illustrating an example method of processing media data according to the techniques of this disclosure.

FIG. 12 is a flowchart illustrating an example method of processing media data according to the techniques of this disclosure. The method of FIG. 12 is explained with respect to system 100 of FIG. 1, and in particular, XR server device 110, for purposes of example. However, it should be understood that other devices may be configured to perform this or a similar method.

Initially, XR server device 110 may receive tracking and sensor information 132 from XR client device 140 (350). For example, XR client device 140 may determine an orientation in which a user is looking using tracking/XR sensors 146. XR client device 140 may send tracking and sensor information 132 representing the orientation in which the user is looking. XR server device 110 may receive tracking and sensor information 132 and provide this information to XR scene generation unit 112. XR scene generation unit 112 and XR viewport pre-rendering rasterization unit 114 may then generate video frames of scene data (352). In some examples, a video game engine may generate the scene data using tracking and sensor information 132, video game data, and video game configuration data.

2D media encoding unit 116 may then encode the generated video frames of the scene data (354). In some examples, as shown in and described with respect to FIG. 6, such encoding may include both intra-prediction encoding all of the frames in one run and inter- or intra-predictive encoding the frames in another run. Intra-prediction encoding may generate vi-trace data, while inter-prediction encoding may generate vp-trace data. XR server device 110 may combine the vi-trace and vp-trace data to form v-trace data, which may represent complexity of encoding of the video frames. In some examples, 2D media encoding unit 116 may encode all frames of a particular v-trace using common, unchanged quantization configuration.

XR media content delivery unit 118 may then packetize slices of the encoded video frames (356). In general, 2D media encoding unit 116 may be configured with a particular maximum transmission unit (MTU) size for packets of a radio access network (RAN) and produce slices having amounts of data less than or equal to the MTU size. Thus, each slice may be capable of transmission within a single packet, in some examples.

XR server device 110 may then perform a RAN simulation of the RAN for transferring the packets (358), e.g., using configuration of network 130. Examples of performing a RAN simulation in this manner are described above with respect to FIGS. 2-4 and 7-9. For example, when performing the RAN simulation, XR server device 110 may determine that a slice is lost when a packet for the slice is lost or corrupted. XR server device 110 may also calculate latencies for transferring the packets. XR server device 110 may also generate S-trace data and P-trace data as discussed above, a part of the RAN simulation.

XR server device 110 may then assemble simulation-received packets into encoded video frames (360) and decode the video frames (362). XR server device 110 may then calculate individual frame qualities (364). The individual frame qualities may represent differences between the video frames prior to or after encoding and the decoded video frames, e.g., as discussed with respect to FIGS. 2 and 8.

XR server device 110 may then determine an overall quality for the system from the individual frame qualities (366). For example, XR server device 110 may determine the overall quality as an average encoding quality and/or an average number of incorrect video frames (e.g., frames for which data was lost or corrupted). XR server device 110 may perform this method for a variety of different types of configurations, e.g., to determine a number of users that can be supported for a given configuration. For example, XR server device 110 may calculate a percentage of corrupted video frames as a function of a number of supported users for one or more sets of configurations. Additionally or alternatively, XR server device 110 may calculate a percentage of corrupted video frames as a function of a quantization configuration for one or more numbers of supported users.

In this manner, the method of FIG. 12 represents an example of a method of processing media data including receiving tracking and sensor information from an extended reality (XR) client device; generating scene data using the tracking and sensor information, the scene data comprising one or more video frames; encoding the video frames to form encoded video frames; performing a radio access network (RAN) simulation of delivering the encoded video frames via a radio access network; decoding the encoded video frames delivered according to the RAN simulation to form decoded video frames; calculating values representing individual frame quality for each of the video frames from the generated one or more video frames and the decoded video frames; and determining an overall quality value from the values representing the individual frame quality for each of the video frames.

The following clauses represent certain examples of the techniques of this disclosure:

Clause 1: A method of sending media data, the method comprising: receiving tracking and sensor information from an extended reality (XR) client device; generating scene data using the tracking and sensor information; rendering an XR viewport to form video data from the scene data; encoding the video data; and sending the encoded video data to the XR client device via a 5G network.

Clause 2: A method of retrieving media data, the method comprising: sending tracking and sensor information to an extended reality (XR) server device; receiving, from the XR server device, encoded video data corresponding to the tracking and sensor information; decoding the encoded video data; and rendering an XR viewport using the decoded video data.

Clause 3: A method comprising a combination of the methods of clauses 1 and 2.

Clause 4: A method of processing media data, the method comprising: receiving tracking and sensor information from an extended reality (XR) client device; generating scene data using the tracking and sensor information, the scene data comprising one or more video frames; encoding the video data to form v-trace data; performing a radio access network (RAN) simulation of delivering the encoded video data via a 5G network; decoding the delivered encoded video data to form decoded video data; calculating values representing quality for each of the video frames from the generated one or more video frames and the decoded video data; and determining an overall quality value from the values representing the quality for each of the video frames.

Clause 5: The method of clause 4, wherein generating the scene data comprises executing a video game engine using the tracking and sensor information, video game data, and video game configuration data.

Clause 6: The method of any of clauses 4 and 5, wherein encoding the video data comprises encoding the video data without changing a quantization configuration.

Clause 7: The method of any of clauses 4-6, wherein determining the overall quality value comprises generating a graph representing a percentage of corrupted video frames as a function of a number of supported users for one or more sets of configurations.

Clause 8: The method of any of clauses 4 and 5, wherein determining the overall quality value comprises generating a graph representing a percentage of corrupted video frames as a function of a quantization configuration for one or more numbers of supported users.

Clause 9: The method of any of clauses 4-8, wherein encoding the video data to form the v-trace data comprises: encoding at least some portions of the video data using inter-prediction to form vp-trace data; encoding at least some portions of the video data using intra-prediction to form vi-trace data; and combining the vp-trace data and the vi-trace data to form the v-trace data.

Clause 10: The method of any of clauses 4-9, wherein the v-trace data is formatted according to a passlogfile format of FFMPEG.

Clause 11: The method of any of clauses 4-10, wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 12: The method of any of clauses 4-11, wherein performing the RAN simulation comprises: receiving one or more slices of the encoded video data corresponding to the v-trace data; packetizing and fragmenting the slices to form packets in p-trace data using real-time transport protocol (RTP) according to IP packet and payload size configuration data; simulating transfer of the packets; determining that one of the slices is lost when a packet for the one of the slices is lost during the simulation of the transfer of the packets; and outputting data representing, for each slice, whether the slice was received or lost during the simulation of the transfer and a latency for transfer of the received packets.

Clause 13: The method of any of clauses 4-12, wherein performing the RAN simulation comprises: receiving one or more slices of the encoded video data corresponding to the v-trace data; and forming s-trace data from the slices according to configuration data indicating a bitrate control technique, slice settings, an error resilience technique, and a feedback technique.

Clause 14: The method of clause 13, wherein the bitrate control technique comprises one of constant quality, constant bitrate, feedback-based variable bitrate, or constant rate factor.

Clause 15: The method of any of clauses 13 and 14, wherein the slice settings comprise one or more of a number of slices or a maximum slice size.

Clause 16: The method of any of clauses 13-15, wherein the error resilience technique comprises one of frame-based resilience, slice-based resilience, regular intra refresh, feedback-based intra refresh, or feedback based prediction.

Clause 17: The method of any of clauses 13-16, wherein the feedback technique comprises one of no feedback, statistical feedback, or operational feedback.

Clause 18: The method of any of clauses 4-17, wherein calculating the values representing the quality for each of the video frames comprises: determining, for each received encoded slice, a quality of the slice; and determining, for non-received slices, whether the non-received slices were lost or of degraded quality.

Clause 19: The method of any of clauses 4-18, wherein determining the overall quality value comprises determining the overall quality value using one or more of an average encoding quality or an average incorrect video data.

Clause 20: A device for processing media data, the device comprising one or more means for performing the method of any of clauses 1-19.

Clause 21: The device of clause 20, wherein the apparatus comprises at least one of: an integrated circuit; a microprocessor; and a wireless communication device.

Clause 22: A computer-readable storage medium having stored thereon instructions that, when executed, cause a processor perform to the method of any of clauses 1-19.

Clause 23: A device for sending media data, the device comprising: means for receiving tracking and sensor information from an extended reality (XR) client device; means for generating scene data using the tracking and sensor information; means for rendering an XR viewport to form video data from the scene data; means for encoding the video data; and means for sending the encoded video data to the XR client device via a 5G network.

Clause 24: A device for retrieving media data, the device comprising: means for sending tracking and sensor information to an extended reality (XR) server device; means for receiving, from the XR server device, encoded video data corresponding to the tracking and sensor information; means for decoding the encoded video data; and means for rendering an XR viewport using the decoded video data.

Clause 25: A device for processing media data, the device comprising: means for receiving tracking and sensor information from an extended reality (XR) client device; means for generating scene data using the tracking and sensor information, the scene data comprising one or more video frames; means for encoding the video data to form v-trace data; means for performing a radio access network (RAN) simulation of delivering the encoded video data via a 5G network; means for decoding the delivered encoded video data to form decoded video data; means for calculating values representing quality for each of the video frames from the generated one or more video frames and the decoded video data; and means for determining an overall quality value from the values representing the quality for each of the video frames.

Clause 26: A method of processing media data, the method comprising: receiving tracking and sensor information from an extended reality (XR) client device; generating scene data using the tracking and sensor information, the scene data comprising one or more video frames; encoding the video frames to form encoded video frames; performing a radio access network (RAN) simulation of delivering the encoded video frames via a radio access network; decoding the encoded video frames delivered according to the RAN simulation to form decoded video frames; calculating values representing individual frame quality for each of the video frames from the generated one or more video frames and the decoded video frames; and determining an overall quality value from the values representing the individual frame quality for each of the video frames.

Clause 27: The method of clause 26, wherein generating the scene data comprises executing a video game engine using the tracking and sensor information, video game data, and video game configuration data.

Clause 28: The method of clause 26, wherein encoding the video frames comprises encoding the video frames without changing a quantization configuration.

Clause 29: The method of clause 26, wherein determining the overall quality value comprises calculating a percentage of corrupted video frames as a function of a number of supported users for one or more sets of configurations.

Clause 30: The method of clause 26, wherein determining the overall quality value comprises calculating a percentage of corrupted video frames as a function of a quantization configuration for one or more numbers of supported users.

Clause 31: The method of clause 26, wherein encoding the video frames further comprises forming v-trace data, the v-trace data representing complexity of the encoding of the video frames, comprising: encoding at least some portions of the video frames using inter-prediction to form vp-trace data; encoding the at least some portions of the video frames using intra-prediction to form vi-trace data; and combining the vp-trace data and the vi-trace data to form the v-trace data.

Clause 32: The method of clause 26, wherein encoding the video frames further comprises forming v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 33: The method of clause 26, wherein performing the RAN simulation comprises: receiving one or more slices of the encoded video frames; packetizing and fragmenting the slices to form packets in p-trace data using real-time transport protocol (RTP) according to IP packet and payload size configuration data; performing a simulation of transfer of the packets; determining that one of the slices is lost when a packet for the one of the slices is lost during the simulation of the transfer of the packets; and outputting data representing, for each slice, whether the slice was received or lost during the simulation of the transfer and a latency for transfer of the received packets.

Clause 34: The method of clause 26, wherein performing the RAN simulation comprises: receiving one or more slices of the encoded video frames; and forming s-trace data from the slices according to configuration data indicating a bitrate control technique, slice settings, an error resilience technique, and a feedback technique.

Clause 35: The method of clause 34, wherein forming the s-trace data comprises assigning, to each of the slices, data representing a frame associated with the slice, a size of the slice, a quality of the slice, an area of the frame covered by the slice, and timing information for the slice.

Clause 36: The method of clause 34, wherein the bitrate control technique comprises one of constant quality, constant bitrate, feedback-based variable bitrate, or constant rate factor.

Clause 37: The method of clause 34, wherein the slice settings comprise one or more of a number of slices or a maximum slice size.

Clause 38: The method of clause 34, wherein the error resilience technique comprises one of frame-based resilience, slice-based resilience, regular intra refresh, feedback-based intra refresh, or feedback-based prediction.

Clause 39: The method of clause 34, wherein the feedback technique comprises one of statistical feedback or operational feedback.

Clause 40: The method of clause 26, wherein calculating the values representing the individual frame quality for each of the video frames comprises: determining, for each received encoded slice of the video frame, a quality of the slice; and determining, for non-received slices of the video frame, whether the non-received slices were lost or of degraded quality.

Clause 41: The method of clause 26, wherein determining the overall quality value comprises determining the overall quality value using one or more of an average encoding quality or an average incorrect video frames.

Clause 42: The method of clause 26, wherein the radio access network comprises a 5G network.

Clause 43: The method of clause 26, wherein the RAN simulation comprises a first RAN simulation of a plurality of RAN simulations, the overall video quality comprises a first overall video quality, and performing the first RAN simulation comprises performing the first RAN simulation using first configuration parameters, the method further comprising: determining respective configuration parameters for each of the plurality of RAN simulations; performing each of the RAN simulations using the respective configuration parameters; determining overall video quality values for each of the RAN simulations; and configuring a network to deliver XR data using the configuration parameters corresponding to the best overall video quality values for the RAN simulations.

Clause 44: A device for processing media data, the device comprising: a memory configured to store video data; and one or more processors implemented in circuitry and configured to: receive tracking and sensor information from an extended reality (XR) client device; generate scene data using the tracking and sensor information, the scene data comprising one or more video frames of the video data; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

Clause 45: The device of clause 44, wherein the one or more processors are configured to execute a video game engine using the tracking and sensor information, video game data, and video game configuration data to generate the scene data.

Clause 46: The device of clause 44, wherein to determine the overall quality value, the one or more processors are configured to calculate a percentage of corrupted video frames as a function of a number of supported users for one or more sets of configurations.

Clause 47: The device of clause 44, wherein to determine the overall quality value, the one or more processors are configured to calculate a percentage of corrupted video frames as a function of a quantization configuration for one or more numbers of supported users.

Clause 48: The device of clause 44, wherein the one or more processors are further configured to form v-trace data, the v-trace data representing complexity of the encoding of the video frames, and wherein to form the v-trace data, the one or more processors are configured to: encode at least some portions of the video frames using inter-prediction to form vp-trace data; encode the at least some portions of the video frames using intra-prediction to form vi-trace data; and combine the vp-trace data and the vi-trace data to form the v-trace data.

Clause 49: The device of clause 44, wherein the one or more processors are further configured to form v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 50: The device of clause 44, wherein to perform the RAN simulation, the one or more processors are configured to: receive one or more slices of the encoded video frames; packetize and fragmenting the slices to form packets in p-trace data using real-time transport protocol (RTP) according to IP packet and payload size configuration data; perform a simulation of transfer of the packets; determine that one of the slices is lost when a packet for the one of the slices is lost during the simulation of the transfer of the packets; and output data representing, for each slice, whether the slice was received or lost during the simulation of the transfer and a latency for transfer of the received packets.

Clause 51: The device of clause 44, wherein to perform the RAN simulation, the one or more processors are configured to: receive one or more slices of the encoded video frames; and form s-trace data from the slices according to configuration data indicating a bitrate control technique, slice settings, an error resilience technique, and a feedback technique.

Clause 52: The device of clause 51, wherein to form the s-trace data, the one or more processors are configured to assign, to each of the slices, data representing a frame associated with the slice, a size of the slice, a quality of the slice, an area of the frame covered by the slice, and timing information for the slice.

Clause 53: The device of clause 44, wherein to calculate the values representing the individual frame quality for each of the video frames, the one or more processors are configured to: determine, for each received encoded slice of the video frame, a quality of the slice; and determine, for non-received slices of the video frame, whether the non-received slices were lost or of degraded quality.

Clause 54: A computer-readable storage medium having stored thereon instructions that, when executed, cause a processor to: receive tracking and sensor information from an extended reality (XR) client device; generate scene data using the tracking and sensor information, the scene data comprising one or more video frames; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

Clause 55: The computer-readable storage medium of clause 54, wherein the instructions that cause the processor to generate the scene data comprise instructions that cause the processor to execute a video game engine using the tracking and sensor information, video game data, and video game configuration data.

Clause 56: The computer-readable storage medium of clause 54, wherein the instructions that cause the processor to determine the overall quality value comprise instructions that cause the processor to calculate a percentage of corrupted video frames as a function of a number of supported users for one or more sets of configurations.

Clause 57: The computer-readable storage medium of clause 54, wherein the instructions that cause the processor to determine the overall quality value comprise instructions that cause the processor to calculate a percentage of corrupted video frames as a function of a quantization configuration for one or more numbers of supported users.

Clause 58: The computer-readable storage medium of clause 54, wherein the instructions that cause the processor to encode the video frames further comprise instructions that cause the processor to form v-trace data, the v-trace data representing complexity of the encoding of the video frames, and wherein the instructions that cause the processor to form the v-trace data include instructions that cause the processor to: encode at least some portions of the video frames using inter-prediction to form vp-trace data; encode the at least some portions of the video frames using intra-prediction to form vi-trace data; and combine the vp-trace data and the vi-trace data to form the v-trace data.

Clause 59: The computer-readable storage medium of clause 54, wherein the instructions that cause the processor to encode the video frames further comprise instructions that cause the processor to form v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 60: The computer-readable storage medium of clause 54, wherein the instructions that cause the processor to perform the RAN simulation comprise instructions that cause the processor to: receive one or more slices of the encoded video frames; packetize and fragmenting the slices to form packets in p-trace data using real-time transport protocol (RTP) according to IP packet and payload size configuration data; perform a simulation of transfer of the packets; determine that one of the slices is lost when a packet for the one of the slices is lost during the simulation of the transfer of the packets; and output data representing, for each slice, whether the slice was received or lost during the simulation of the transfer and a latency for transfer of the received packets.

Clause 61: The computer-readable storage medium of clause 54, wherein the instructions that cause the processor to perform the RAN simulation comprise instructions that cause the processor to: receive one or more slices of the encoded video frames; and form s-trace data from the slices according to configuration data indicating a bitrate control technique, slice settings, an error resilience technique, and a feedback technique.

Clause 62: The computer-readable storage medium of clause 61, wherein the instructions that cause the processor to form the s-trace data comprise instructions that cause the processor to assign, to each of the slices, data representing a frame associated with the slice, a size of the slice, a quality of the slice, an area of the frame covered by the slice, and timing information for the slice.

Clause 63: The computer-readable storage medium of clause 54, wherein the instructions that cause the processor to calculate the values representing the individual frame quality for each of the video frames comprise instructions that cause the processor to: determine, for each received encoded slice of the video frame, a quality of the slice; and determine, for non-received slices of the video frame, whether the non-received slices were lost or of degraded quality.

Clause 64: A device for processing media data, the device comprising: means for receiving tracking and sensor information from an extended reality (XR) client device; means for generating scene data using the tracking and sensor information, the scene data comprising one or more video frames; means for encoding the video frames to form encoded video frames; means for performing a radio access network (RAN) simulation of delivering the encoded video frames via a radio access network; means for decoding the encoded video frames delivered according to the RAN simulation to form decoded video frames; means for calculating values representing individual frame quality for each of the video frames from the generated one or more video frames and the decoded video frames; and means for determining an overall quality value from the values representing the individual frame quality for each of the video frames.

Clause 65: A method of processing media data, the method comprising: receiving tracking and sensor information from an extended reality (XR) client device; generating scene data using the tracking and sensor information, the scene data comprising one or more video frames; encoding the video frames to form encoded video frames; performing a radio access network (RAN) simulation of delivering the encoded video frames via a radio access network; decoding the encoded video frames delivered according to the RAN simulation to form decoded video frames; calculating values representing individual frame quality for each of the video frames from the generated one or more video frames and the decoded video frames; and determining an overall quality value from the values representing the individual frame quality for each of the video frames.

Clause 66: The method of clause 65, wherein generating the scene data comprises executing a video game engine using the tracking and sensor information, video game data, and video game configuration data.

Clause 67: The method of any of clauses 65-66, wherein encoding the video frames comprises encoding the video frames without changing a quantization configuration.

Clause 68: The method of any of clauses 65-67, wherein determining the overall quality value comprises calculating a percentage of corrupted video frames as a function of a number of supported users for one or more sets of configurations.

Clause 69: The method any of clauses 65-68, wherein determining the overall quality value comprises calculating a percentage of corrupted video frames as a function of a quantization configuration for one or more numbers of supported users.

Clause 70: The method of any of clauses 65-69, wherein encoding the video frames further comprises forming v-trace data, the v-trace data representing complexity of the encoding of the video frames, comprising: encoding at least some portions of the video frames using inter-prediction to form vp-trace data; encoding the at least some portions of the video frames using intra-prediction to form vi-trace data; and combining the vp-trace data and the vi-trace data to form the v-trace data.

Clause 71: The method any of clauses 65-70, wherein encoding the video frames further comprises forming v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 72: The method of any of clauses 65-71, wherein performing the RAN simulation comprises: receiving one or more slices of the encoded video frames; packetizing and fragmenting the slices to form packets in p-trace data using real-time transport protocol (RTP) according to IP packet and payload size configuration data; performing a simulation of transfer of the packets; determining that one of the slices is lost when a packet for the one of the slices is lost during the simulation of the transfer of the packets; and outputting data representing, for each slice, whether the slice was received or lost during the simulation of the transfer and a latency for transfer of the received packets.

Clause 73: The method of any of clauses 65-72, wherein performing the RAN simulation comprises: receiving one or more slices of the encoded video frames; and forming s-trace data from the slices according to configuration data indicating a bitrate control technique, slice settings, an error resilience technique, and a feedback technique.

Clause 74: The method of clause 73, wherein forming the s-trace data comprises assigning, to each of the slices, data representing a frame associated with the slice, a size of the slice, a quality of the slice, an area of the frame covered by the slice, and timing information for the slice.

Clause 75: The method of any of clauses 73 and 74, wherein the bitrate control technique comprises one of constant quality, constant bitrate, feedback-based variable bitrate, or constant rate factor.

Clause 76: The method of any of clauses 73-75, wherein the slice settings comprise one or more of a number of slices or a maximum slice size.

Clause 77: The method of any of clauses 73-76, wherein the error resilience technique comprises one of frame-based resilience, slice-based resilience, regular intra refresh, feedback-based intra refresh, or feedback based prediction.

Clause 78: The method of any of clauses 73-77, wherein the feedback technique comprises one of statistical feedback or operational feedback.

Clause 79: The method of any of clauses 65-78, wherein calculating the values representing the individual frame quality for each of the video frames comprises: determining, for each received encoded slice of the video frame, a quality of the slice; and determining, for non-received slices of the video frame, whether the non-received slices were lost or of degraded quality.

Clause 80: The method of any of clauses 65-79, wherein determining the overall quality value comprises determining the overall quality value using one or more of an average encoding quality or an average incorrect video frames.

Clause 81: The method of any of clauses 65-80, wherein the radio access network comprises a 5G network.

Clause 82: The method of any of clauses 65-81, wherein the RAN simulation comprises a first RAN simulation of a plurality of RAN simulations, the overall video quality comprises a first overall video quality, and performing the first RAN simulation comprises performing the first RAN simulation using first configuration parameters, the method further comprising: determining respective configuration parameters for each of the plurality of RAN simulations; performing each of the RAN simulations using the respective configuration parameters; determining overall video quality values for each of the RAN simulations; and configuring a network to deliver XR data using the configuration parameters corresponding to the best overall video quality values for the RAN simulations.

Clause 83: A device for processing media data, the device comprising: a memory configured to store video data; and one or more processors implemented in circuitry and configured to: receive tracking and sensor information from an extended reality (XR) client device; generate scene data using the tracking and sensor information, the scene data comprising one or more video frames of the video data; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

Clause 84: The device of clause 83, wherein the one or more processors are configured to execute a video game engine using the tracking and sensor information, video game data, and video game configuration data to generate the scene data.

Clause 85: The device of any of clauses 83 and 84, wherein to determine the overall quality value, the one or more processors are configured to calculate a percentage of corrupted video frames as a function of a number of supported users for one or more sets of configurations.

Clause 86: The device of any of clauses 83-85, wherein to determine the overall quality value, the one or more processors are configured to calculate a percentage of corrupted video frames as a function of a quantization configuration for one or more numbers of supported users.

Clause 87: The device of any of clauses 83-86, wherein the one or more processors are further configured to form v-trace data, the v-trace data representing complexity of the encoding of the video frames, and wherein to form the v-trace data, the one or more processors are configured to: encode at least some portions of the video frames using inter-prediction to form vp-trace data; encode the at least some portions of the video frames using intra-prediction to form vi-trace data; and combine the vp-trace data and the vi-trace data to form the v-trace data.

Clause 88: The device of any of clauses 83-87, wherein the one or more processors are further configured to form v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 89: The device of any of clauses 83-88, wherein to perform the RAN simulation, the one or more processors are configured to: receive one or more slices of the encoded video frames; packetize and fragmenting the slices to form packets in p-trace data using real-time transport protocol (RTP) according to IP packet and payload size configuration data; perform a simulation of transfer of the packets; determine that one of the slices is lost when a packet for the one of the slices is lost during the simulation of the transfer of the packets; and output data representing, for each slice, whether the slice was received or lost during the simulation of the transfer and a latency for transfer of the received packets.

Clause 90: The device of any of clauses 83-89, wherein to perform the RAN simulation, the one or more processors are configured to: receive one or more slices of the encoded video frames; and form s-trace data from the slices according to configuration data indicating a bitrate control technique, slice settings, an error resilience technique, and a feedback technique.

Clause 91: The device of clause 90, wherein to form the s-trace data, the one or more processors are configured to assign, to each of the slices, data representing a frame associated with the slice, a size of the slice, a quality of the slice, an area of the frame covered by the slice, and timing information for the slice.

Clause 92: The device of any of clauses 83-91, wherein to calculate the values representing the individual frame quality for each of the video frames, the one or more processors are configured to: determine, for each received encoded slice of the video frame, a quality of the slice; and determine, for non-received slices of the video frame, whether the non-received slices were lost or of degraded quality.

Clause 93: A computer-readable storage medium having stored thereon instructions that, when executed, cause a processor to: receive tracking and sensor information from an extended reality (XR) client device; generate scene data using the tracking and sensor information, the scene data comprising one or more video frames; encode the video frames to form encoded video frames; perform a radio access network (RAN) simulation of delivering the encoded video frames via a radio access network; decode the encoded video frames delivered according to the RAN simulation to form decoded video frames; calculate values representing individual frame quality for each of the video frames from the generated one or more video frames and the decoded video frames; and determine an overall quality value from the values representing the individual frame quality for each of the video frames.

Clause 94: The computer-readable storage medium of clause 93, wherein the instructions that cause the processor to generate the scene data comprise instructions that cause the processor to execute a video game engine using the tracking and sensor information, video game data, and video game configuration data.

Clause 95: The computer-readable storage medium of any of clauses 93 and 94, wherein the instructions that cause the processor to determine the overall quality value comprise instructions that cause the processor to calculate a percentage of corrupted video frames as a function of a number of supported users for one or more sets of configurations.

Clause 96: The computer-readable storage medium of any of clauses 93-95, wherein the instructions that cause the processor to determine the overall quality value comprise instructions that cause the processor to calculate a percentage of corrupted video frames as a function of a quantization configuration for one or more numbers of supported users.

Clause 97: The computer-readable storage medium of any of clauses 93-96, wherein the instructions that cause the processor to encode the video frames further comprise instructions that cause the processor to form v-trace data, the v-trace data representing complexity of the encoding of the video frames, and wherein the instructions that cause the processor to form the v-trace data include instructions that cause the processor to: encode at least some portions of the video frames using inter-prediction to form vp-trace data; encode the at least some portions of the video frames using intra-prediction to form vi-trace data; and combine the vp-trace data and the vi-trace data to form the v-trace data.

Clause 98: The computer-readable storage medium of any of clauses 93-97, wherein the instructions that cause the processor to encode the video frames further comprise instructions that cause the processor to form v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

Clause 99: The computer-readable storage medium of any of clauses 93-98, wherein the instructions that cause the processor to perform the RAN simulation comprise instructions that cause the processor to: receive one or more slices of the encoded video frames; packetize and fragmenting the slices to form packets in p-trace data using real-time transport protocol (RTP) according to IP packet and payload size configuration data; perform a simulation of transfer of the packets; determine that one of the slices is lost when a packet for the one of the slices is lost during the simulation of the transfer of the packets; and output data representing, for each slice, whether the slice was received or lost during the simulation of the transfer and a latency for transfer of the received packets.

Clause 100: The computer-readable storage medium of any of clauses 93-99, wherein the instructions that cause the processor to perform the RAN simulation comprise instructions that cause the processor to: receive one or more slices of the encoded video frames; and form s-trace data from the slices according to configuration data indicating a bitrate control technique, slice settings, an error resilience technique, and a feedback technique.

Clause 101: The computer-readable storage medium of clause 100, wherein the instructions that cause the processor to form the s-trace data comprise instructions that cause the processor to assign, to each of the slices, data representing a frame associated with the slice, a size of the slice, a quality of the slice, an area of the frame covered by the slice, and timing information for the slice.

Clause 102: The computer-readable storage medium of any of clauses 93-101, wherein the instructions that cause the processor to calculate the values representing the individual frame quality for each of the video frames comprise instructions that cause the processor to: determine, for each received encoded slice of the video frame, a quality of the slice; and determine, for non-received slices of the video frame, whether the non-received slices were lost or of degraded quality.

Clause 103: A device for processing media data, the device comprising: means for receiving tracking and sensor information from an extended reality (XR) client device; means for generating scene data using the tracking and sensor information, the scene data comprising one or more video frames; means for encoding the video frames to form encoded video frames; means for performing a radio access network (RAN) simulation of delivering the encoded video frames via a radio access network; means for decoding the encoded video frames delivered according to the RAN simulation to form decoded video frames; means for calculating values representing individual frame quality for each of the video frames from the generated one or more video frames and the decoded video frames; and means for determining an overall quality value from the values representing the individual frame quality for each of the video frames.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:
    receiving tracking and sensor information from an extended reality (XR) client device;
    generating scene data using the tracking and sensor information, the scene data comprising one or more video frames;
    encoding the video frames to form encoded video frames;
    performing a radio access network (RAN) simulation of delivering the encoded video frames via a radio access network;
    decoding the encoded video frames delivered according to the RAN simulation to form decoded video frames;
    calculating values representing individual frame quality for each of the video frames from the generated one or more video frames and the decoded video frames; and
    determining an overall quality value from the values representing the individual frame quality for each of the video frames.

2. The method of claim 1, wherein generating the scene data comprises executing a video game engine using the tracking and sensor information, video game data, and video game configuration data.

3. The method of claim 1, wherein encoding the video frames comprises encoding the video frames without changing a quantization configuration.

4. The method of claim 1, wherein determining the overall quality value comprises calculating a percentage of corrupted video frames as a function of a number of supported users for one or more sets of configurations.

5. The method of claim 1, wherein determining the overall quality value comprises calculating a percentage of corrupted video frames as a function of a quantization configuration for one or more numbers of supported users.

6. The method of claim 1, wherein encoding the video frames further comprises forming v-trace data, the v-trace data representing complexity of the encoding of the video frames, comprising:

encoding at least some portions of the video frames using inter-prediction to form vp-trace data;
encoding the at least some portions of the video frames using intra-prediction to form vi-trace data; and
combining the vp-trace data and the vi-trace data to form the v-trace data.

7. The method of claim 1, wherein encoding the video frames further comprises forming v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

8. The method of claim 1, wherein performing the RAN simulation comprises:
receiving one or more slices of the encoded video frames;
packetizing and fragmenting the slices to form packets in p-trace data using real-time transport protocol (RTP) according to IP packet and payload size configuration data;
performing a simulation of transfer of the packets;
determining that one of the slices is lost when a packet for the one of the slices is lost during the simulation of the transfer of the packets; and
outputting data representing, for each slice, whether the slice was received or lost during the simulation of the transfer and a latency for transfer of the received packets.

9. The method of claim 1, wherein performing the RAN simulation comprises:
receiving one or more slices of the encoded video frames; and
forming s-trace data from the slices according to configuration data indicating a bitrate control technique, slice settings, an error resilience technique, and a feedback technique.

10. The method of claim 9, wherein forming the s-trace data comprises assigning, to each of the slices, data representing a frame associated with the slice, a size of the slice, a quality of the slice, an area of the frame covered by the slice, and timing information for the slice.

11. The method of claim 9, wherein the bitrate control technique comprises one of constant quality, constant bitrate, feedback-based variable bitrate, or constant rate factor.

12. The method of claim 9, wherein the slice settings comprise one or more of a number of slices or a maximum slice size.

13. The method of claim 9, wherein the error resilience technique comprises one of frame-based resilience, slice-based resilience, regular intra refresh, feedback-based intra refresh, or feedback based prediction.

14. The method of claim 9, wherein the feedback technique comprises one of statistical feedback or operational feedback.

15. The method of claim 1, wherein calculating the values representing the individual frame quality for each of the video frames comprises:
determining, for each received encoded slice of the video frame, a quality of the slice; and
determining, for non-received slices of the video frame, whether the non-received slices were lost or of degraded quality.

16. The method of claim 1, wherein determining the overall quality value comprises determining the overall quality value using one or more of an average encoding quality or an average incorrect number of video frames.

17. The method of claim 1, wherein the radio access network comprises a 5G network.

18. The method of claim 1, wherein the RAN simulation comprises a first RAN simulation of a plurality of RAN simulations, the overall video quality comprises a first overall video quality, and performing the first RAN simulation comprises performing the first RAN simulation using first configuration parameters, the method further comprising:
determining respective configuration parameters for each of the plurality of RAN simulations;
performing each of the RAN simulations using the respective configuration parameters;
determining overall video quality values for each of the RAN simulations; and
configuring a network to deliver XR data using the configuration parameters corresponding to the best overall video quality values for the RAN simulations.

19. A device for processing media data, the device comprising:
a memory configured to store video data; and
one or more processors implemented in circuitry and configured to:
receive tracking and sensor information from an extended reality (XR) client device;
generate scene data using the tracking and sensor information, the scene data comprising one or more video frames of the video data;
encode the video frames to form encoded video frames;
perform a radio access network (RAN) simulation of delivering the encoded video frames via a radio access network;
decode the encoded video frames delivered according to the RAN simulation to form decoded video frames;
calculate values representing individual frame quality for each of the video frames from the generated one or more video frames and the decoded video frames; and
determine an overall quality value from the values representing the individual frame quality for each of the video frames.

20. The device of claim 19, wherein the one or more processors are configured to execute a video game engine using the tracking and sensor information, video game data, and video game configuration data to generate the scene data.

21. The device of claim 19, wherein to determine the overall quality value, the one or more processors are configured to calculate a percentage of corrupted video frames as a function of a number of supported users for one or more sets of configurations.

22. The device of claim 19, wherein to determine the overall quality value, the one or more processors are configured to calculate a percentage of corrupted video frames as a function of a quantization configuration for one or more numbers of supported users.

23. The device of claim 19, wherein the one or more processors are further configured to form v-trace data, the v-trace data representing complexity of the encoding of the video frames, and wherein to form the v-trace data, the one or more processors are configured to:

encode at least some portions of the video frames using inter-prediction to form vp-trace data;
encode the at least some portions of the video frames using intra-prediction to form vi-trace data; and
combine the vp-trace data and the vi-trace data to form the v-trace data.

24. The device of claim 19, wherein the one or more processors are further configured to form v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

25. The device of claim 19, wherein to perform the RAN simulation, the one or more processors are configured to:
receive one or more slices of the encoded video frames;
packetize and fragmenting the slices to form packets in p-trace data using real-time transport protocol (RTP) according to IP packet and payload size configuration data;
perform a simulation of transfer of the packets;
determine that one of the slices is lost when a packet for the one of the slices is lost during the simulation of the transfer of the packets; and
output data representing, for each slice, whether the slice was received or lost during the simulation of the transfer and a latency for transfer of the received packets.

26. The device of claim 19, wherein to perform the RAN simulation, the one or more processors are configured to:
receive one or more slices of the encoded video frames; and
form s-trace data from the slices according to configuration data indicating a bitrate control technique, slice settings, an error resilience technique, and a feedback technique.

27. The device of claim 26, wherein to form the s-trace data, the one or more processors are configured to assign, to each of the slices, data representing a frame associated with the slice, a size of the slice, a quality of the slice, an area of the frame covered by the slice, and timing information for the slice.

28. The device of claim 19, wherein to calculate the values representing the individual frame quality for each of the video frames, the one or more processors are configured to:
determine, for each received encoded slice of the video frame, a quality of the slice; and
determine, for non-received slices of the video frame, whether the non-received slices were lost or of degraded quality.

29. A computer-readable storage medium having stored thereon instructions that, when executed, cause a processor to:
receive tracking and sensor information from an extended reality (XR) client device;
generate scene data using the tracking and sensor information, the scene data comprising one or more video frames;
encode the video frames to form encoded video frames;
perform a radio access network (RAN) simulation of delivering the encoded video frames via a radio access network;
decode the encoded video frames delivered according to the RAN simulation to form decoded video frames;
calculate values representing individual frame quality for each of the video frames from the generated one or more video frames and the decoded video frames; and
determine an overall quality value from the values representing the individual frame quality for each of the video frames.

30. The computer-readable storage medium of claim 29, wherein the instructions that cause the processor to generate the scene data comprise instructions that cause the processor to execute a video game engine using the tracking and sensor information, video game data, and video game configuration data.

31. The computer-readable storage medium of claim 29, wherein the instructions that cause the processor to determine the overall quality value comprise instructions that cause the processor to calculate a percentage of corrupted video frames as a function of a number of supported users for one or more sets of configurations.

32. The computer-readable storage medium of claim 29, wherein the instructions that cause the processor to determine the overall quality value comprise instructions that cause the processor to calculate a percentage of corrupted video frames as a function of a quantization configuration for one or more numbers of supported users.

33. The computer-readable storage medium of claim 29, wherein the instructions that cause the processor to encode the video frames further comprise instructions that cause the processor to form v-trace data, the v-trace data representing complexity of the encoding of the video frames, and wherein the instructions that cause the processor to form the v-trace data include instructions that cause the processor to:
encode at least some portions of the video frames using inter-prediction to form vp-trace data;
encode the at least some portions of the video frames using intra-prediction to form vi-trace data; and
combine the vp-trace data and the vi-trace data to form the v-trace data.

34. The computer-readable storage medium of claim 29, wherein the instructions that cause the processor to encode the video frames further comprise instructions that cause the processor to form v-trace data, the v-trace data representing complexity of the encoding of the video frames, and wherein the v-trace data includes one or more of a display picture number value, a coded picture number value, a picture type value, a quality value, an intra-texture-bits value, an inter-texture-bits value, a motion vector bits value, a miscellaneous bits value, an f-code value, a b-code value, a mc_mb_var_sum value, an mb_var_sum value, an i_count value, a skip count value, or a header bits value.

35. The computer-readable storage medium of claim 29, wherein the instructions that cause the processor to perform the RAN simulation comprise instructions that cause the processor to:
receive one or more slices of the encoded video frames;
packetize and fragmenting the slices to form packets in p-trace data using real-time transport protocol (RTP) according to IP packet and payload size configuration data;
perform a simulation of transfer of the packets;
determine that one of the slices is lost when a packet for the one of the slices is lost during the simulation of the transfer of the packets; and output data representing, for each slice, whether the slice was received or lost during the simulation of the transfer and a latency for transfer of the received packets.

36. The computer-readable storage medium of claim 29, wherein the instructions that cause the processor to perform the RAN simulation comprise instructions that cause the processor to:
receive one or more slices of the encoded video frames; and
form s-trace data from the slices according to configuration data indicating a bitrate control technique, slice settings, an error resilience technique, and a feedback technique.

37. The computer-readable storage medium of claim 36, wherein the instructions that cause the processor to form the s-trace data comprise instructions that cause the processor to assign, to each of the slices, data representing a frame associated with the slice, a size of the slice, a quality of the slice, an area of the frame covered by the slice, and timing information for the slice.

38. The computer-readable storage medium of claim 29, wherein the instructions that cause the processor to calculate the values representing the individual frame quality for each of the video frames comprise instructions that cause the processor to:
determine, for each received encoded slice of the video frame, a quality of the slice; and
determine, for non-received slices of the video frame, whether the non-received slices were lost or of degraded quality.

39. A device for processing media data, the device comprising:
means for receiving tracking and sensor information from an extended reality (XR) client device;
means for generating scene data using the tracking and sensor information, the scene data comprising one or more video frames;
means for encoding the video frames to form encoded video frames;
means for performing a radio access network (RAN) simulation of delivering the encoded video frames via a radio access network;
means for decoding the encoded video frames delivered according to the RAN simulation to form decoded video frames;
means for calculating values representing individual frame quality for each of the video frames from the generated one or more video frames and the decoded video frames; and
means for determining an overall quality value from the values representing the individual frame quality for each of the video frames.

* * * * *